US012164053B2

(12) United States Patent
Chen et al.

(10) Patent No.: US 12,164,053 B2
(45) Date of Patent: Dec. 10, 2024

(54) METHODS AND APPARATUS TO MANAGE AUTOMOTIVE RADAR COORDINATION

(71) Applicant: Intel Corporation, Santa Clara, CA (US)

(72) Inventors: Chulong Chen, Santa Clara, CA (US); Zhibin Yu, Unterhaching (DE); Alon Cohen, Petach Tikva (IL); Qing Xu, Unterhaching (DE); Saiveena Kesaraju, Hillsboro, OR (US); Oren Shalita, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 358 days.

(21) Appl. No.: 17/597,761

(22) PCT Filed: Sep. 24, 2019

(86) PCT No.: PCT/US2019/052698
§ 371 (c)(1),
(2) Date: Jan. 21, 2022

(87) PCT Pub. No.: WO2021/061106
PCT Pub. Date: Apr. 1, 2021

(65) Prior Publication Data
US 2022/0260671 A1     Aug. 18, 2022

(51) Int. Cl.
*G01S 7/00*     (2006.01)
*G01S 7/02*     (2006.01)
*G01S 13/931*     (2020.01)

(52) U.S. Cl.
CPC ............ *G01S 7/003* (2013.01); *G01S 7/0232* (2021.05); *G01S 7/0235* (2021.05);
(Continued)

(58) Field of Classification Search
CPC ................ G01S 13/867; G01S 13/931; G01S 2013/9316; G01S 2013/93271;
(Continued)

(56) References Cited

U.S. PATENT DOCUMENTS 5,748,141 A    5/1998 Hoess
2004/0066323 A1    4/2004 Richter
(Continued)

FOREIGN PATENT DOCUMENTS

KR    20170040604 A    4/2017

OTHER PUBLICATIONS

International Searchign Authority, "International Preliminary Report on Patentability", issued in connection with PCT patent application No. PCT/US2019/052698, issued on Mar. 15, 2022, 7 pages.
(Continued)

*Primary Examiner* — Timothy X Pham
(74) *Attorney, Agent, or Firm* — HANLEY, FLIGHT & ZIMMERMAN, LLC

(57) ABSTRACT

Methods, apparatus, systems and articles of manufacture to manage automotive radar coordination are disclosed. An example apparatus includes a resource manager to retrieve radar unit requirements, the radar unit requirements including at least one of a unit ID, current time information, vehicle position, and radar resource requirements, a resource multiplexer to perform at least one of time multiplexing and frequency multiplexing according to the radar resource requirements, and a resource hopper to at least perform one of frequency hopping and time hopping in response to detecting an amount of interference from other vehicles that exceeds an interference threshold.

25 Claims, 15 Drawing Sheets

(52) U.S. Cl.
CPC ..... *G01S 13/931* (2013.01); *G01S 2013/9316* (2020.01); *G01S 2013/93271* (2020.01)

(58) Field of Classification Search
CPC ........... G01S 2013/93272; G01S 7/003; G01S 7/006; G01S 7/0232; G01S 7/0235
See application file for complete search history.

(56) References Cited

U.S. PATENT DOCUMENTS

| | | |
|---|---|---|
| 2007/0200747 A1 | 8/2007 | Okai et al. |
| 2017/0086028 A1 | 3/2017 | Hwang et al. |
| 2017/0290009 A1 | 10/2017 | Feng et al. |
| 2018/0176923 A1 | 6/2018 | Buburuzan |
| 2019/0104525 A1 | 4/2019 | Santhanam et al. |
| 2020/0341131 A1* | 10/2020 | You .................. G01S 7/352 |
| 2021/0063566 A1* | 3/2021 | Smith ................ G06V 20/58 |
| 2022/0365169 A1* | 11/2022 | Lefevre ............. G01S 7/0235 |

OTHER PUBLICATIONS

International Searching Authority, "International Search Report and Written Opinion," issued in connection with the PCT Patent application No. PCT/US2019/052698 issued on Jun. 24, 2020, 9 pages.
Aydogdu et al., "Radar Interference Mitigation for Automated Driving," IEEE Signal Processing Magazine Sep. 23, 2019, 21 pages.
Yang et al, "Automatic categorization-based multi-stage pedestrian detection", Intelligent Transportation Systems (ITSC), 2012 15th International IEEE Conference on, IEEE, dated Sep. 16, 2012, pp. 451-456 DOI: 10.1109/ITSC.2012.6338874 ISBN: 978-1-4673-3064-0, 6 pages.
European Patent Office, "Extended European Search Report," issued in connection with European Patent Application No. 19946876.0, dated May 8, 2023, 18 pages.

* cited by examiner

METHODS AND APPARATUS TO MANAGE AUTOMOTIVE RADAR COORDINATION

FIELD OF THE DISCLOSURE

This disclosure relates generally to automotive radar coordination, and, more particularly, to methods and apparatus to manage automotive radar coordination.

BACKGROUND

In recent years, radar units are increasingly incorporated into automotive vehicles for use in advanced driver-assistance systems (ADAS). In general, radar units transmit a radiofrequency (RF) signal via an antenna in a particular direction and receive echoes that are reflected off of objects in the radar range. These echoes can then be used to determine characteristics of the object, such as its position and velocity. Radar is used in ADAS to increase vehicle safety with features such as adaptive cruise control, blind spot monitoring, and collision avoidance.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The use and number of radar units in automotive vehicles in recent years has increased. Radar units of automotive vehicles are often used in safety features, such as adaptive cruise control and collision avoidance. Additionally, radar units are used in the recent development of autonomous vehicles. Advanced driver-assistance systems (ADAS) radar units have traditionally been used in vehicles, however, more advanced imaging radars that use multiple-input multiple-output (MIMO) arrays are increasingly being utilized. MIMO array radar units can consume more resources (e.g., time and frequency) compared to existing ADAS radar units.

The expected deployment of several radar units within a single vehicle combined with the expected increase in number of vehicles equipped with radar units introduces the severe potential for mutual interference between different radar units within and between vehicles. Interference between radar units can cause incorrect timing estimation and object detection, severely limiting the functionality of the radar units. Additionally, new uses of radar units (e.g., in autonomous vehicles) has created a need for longer propagation ranges of RF signals. A longer propagation range of a radar unit requires higher transmission power, which can result in harmful levels of radiation for pedestrians within the radar range.

Figure 1:
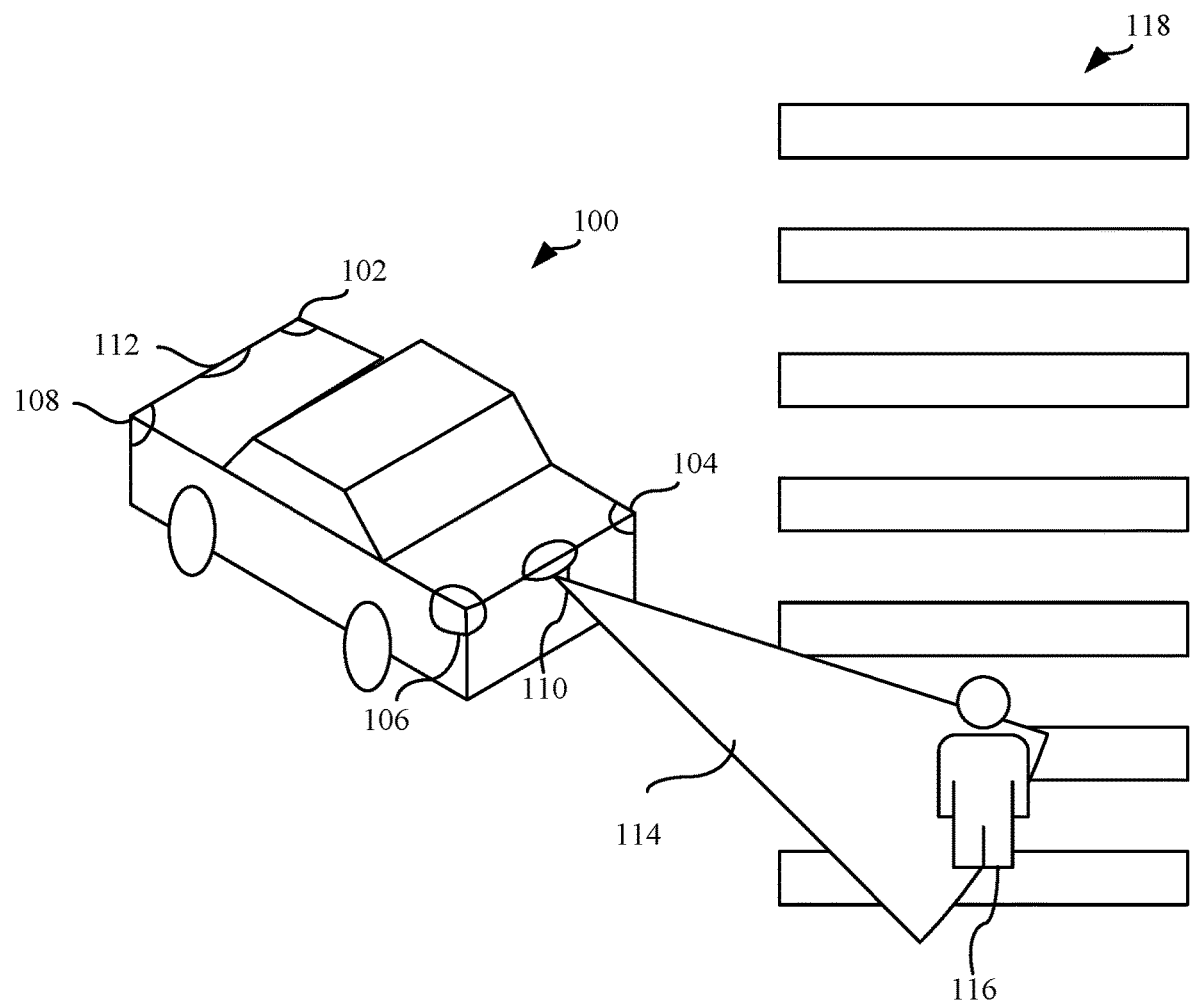
FIG. 1 is a schematic illustration of an example vehicle equipped with radar units suitably constructed in accordance with teachings of this disclosure to manage automotive radar coordination.

FIG. 1 is a schematic illustration of an example vehicle 100 equipped with example co-located mid-range radar (MRR) units 102, 104, 106, 108 and example long-range radar (LRR) units 110 and 112 suitably constructed in accordance with teachings of this disclosure to manage automotive radar coordination. While the illustrated example of FIG. 1 includes four example MRR units 102-108 and two example LRR units 110-112, examples disclosed herein are not limited thereto. For example, there can be any combination and number of both MRR and LRR units. The example MRR units 102-108 and LRR units 110-112 can be but are not limited to ADAS or MIMO array radar units. In the illustrated example of FIG. 1, an example LRR beam 114 is associated with the example LRR unit 110. An example pedestrian 116 is illustrated in an example crosswalk 118 and within the range of the example LRR beam 114.

Figure 2:
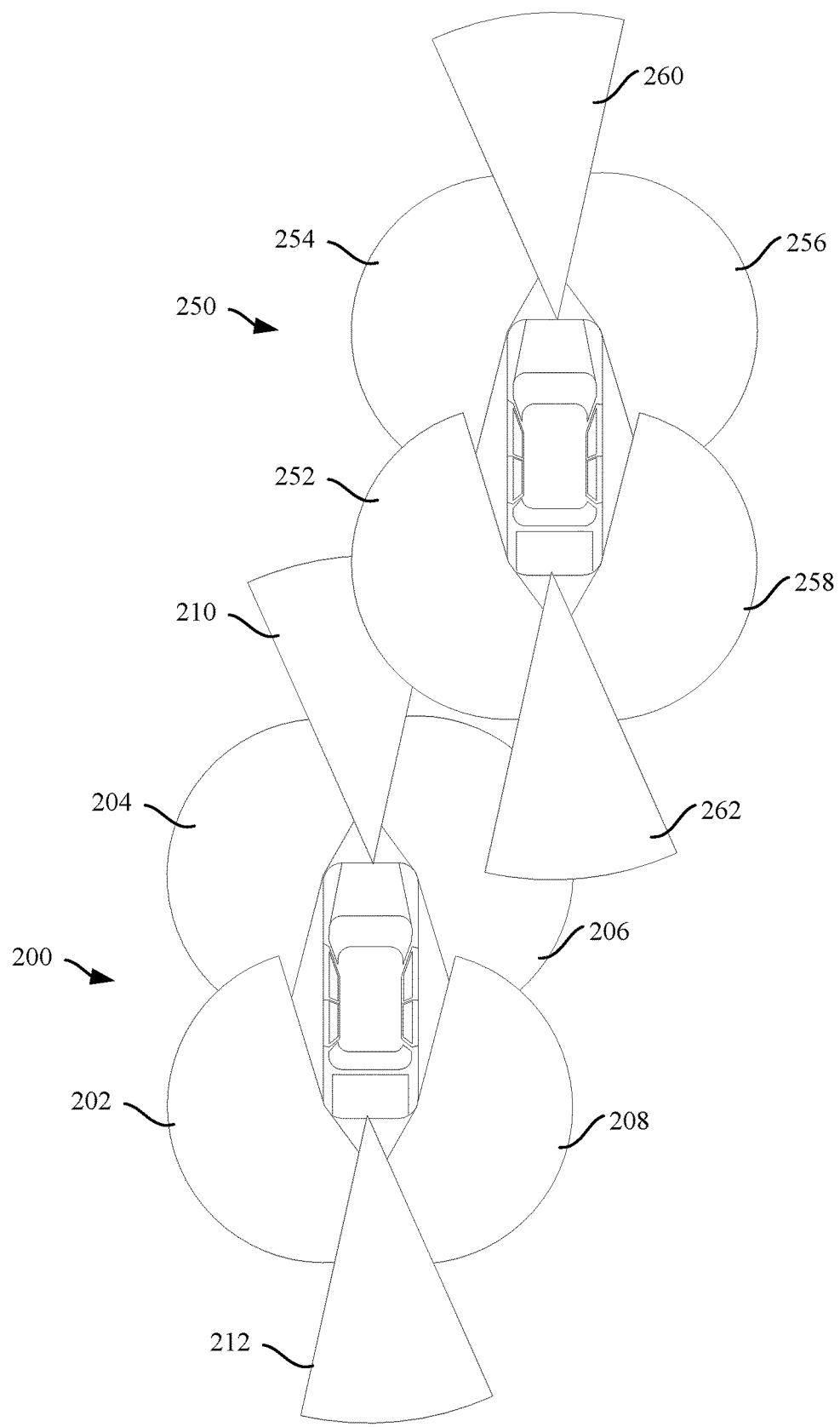
FIG. 2 is a schematic illustration of an example scenario of two vehicles with interfering radar units.

FIG. 2 is a schematic illustration of an example scenario of two example vehicles 200 and 250 with interfering radar units. The example vehicle 200 is equipped with example MRR units 202, 204, 206, 208 and example LRR units 210 and 212. The example vehicle 250 is equipped with example MRR units 252, 254, 256, 258 and example LRR units 260 and 262. In the example disclosed herein, the example LRR unit 210 of the example vehicle 200 interferes with the example MRR unit 252 of the example vehicle 250. Additionally, the example MRR unit 206 of the example vehicle 200 interferes with the example LRR unit 262 of the example vehicle 250. However, in some examples there can be any combination of interferences between any number of radar units.

Figure 3:
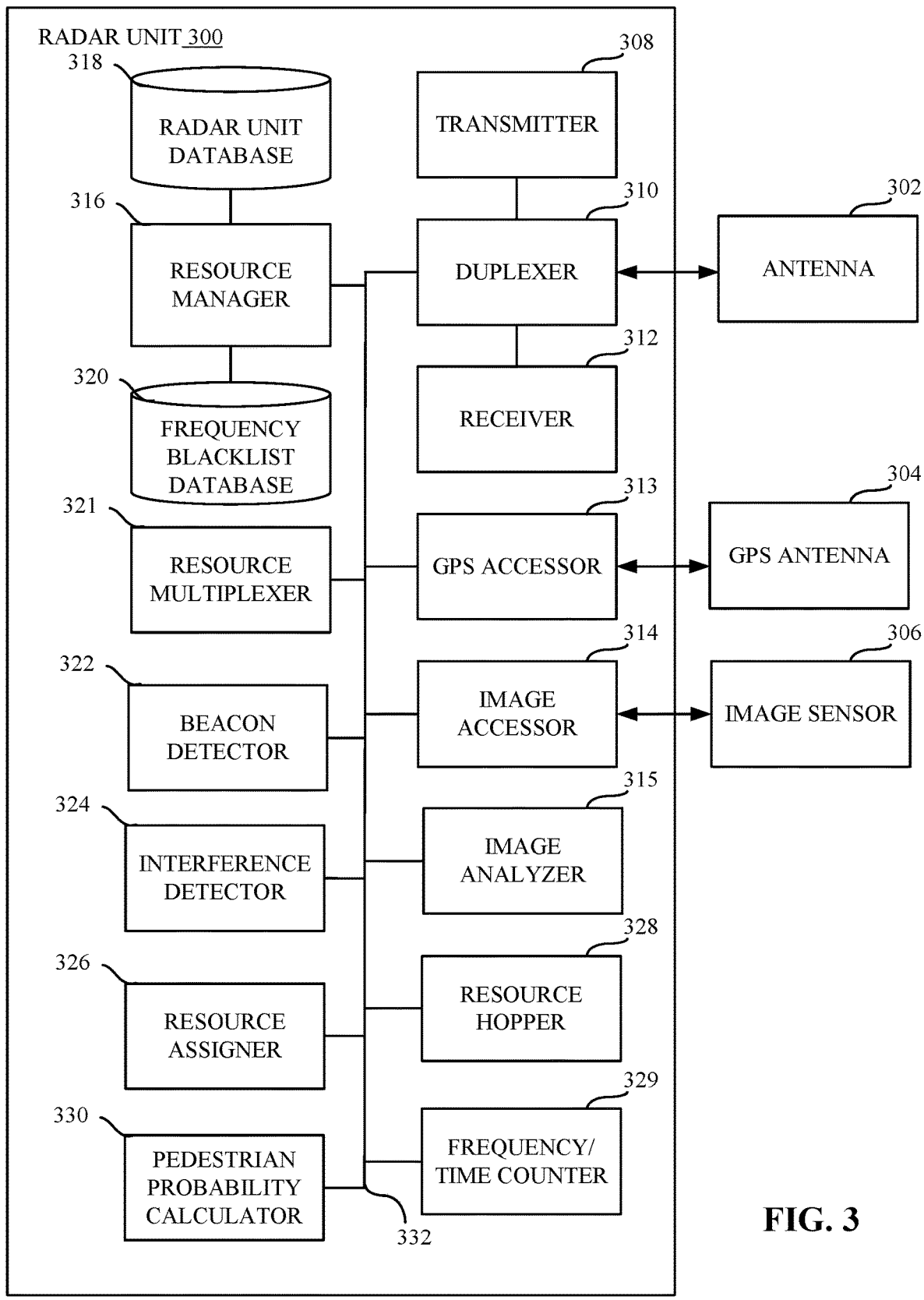
FIG. 3 is a schematic illustration of an example radar unit to send and receive radio signals, sense the surrounding environment, and manage radar coordination in accordance with teachings of this disclosure.

FIG. 3 is a schematic illustration of an example radar unit 300 used to send and receive RF signals, sense the surrounding environment, and manage radar coordination in accordance with teachings of this disclosure. In the example disclosed herein, the example radar unit 300 is communicatively connected to an antenna 302, a GPS antenna 304, and an image sensor 306. The example radar unit 300 is equipped with a transmitter 308, a duplexer 310, and a receiver 312 to send and receive RF signals. The example radar unit 300 also contains a GPS accessor 313, an image accessor 314, and an image analyzer 315. The example radar unit 300 is equipped with a resource manager 316 with access to a radar unit database 318 and a frequency blacklist database 320. The example radar unit 300 illustrated herein also contains a resource multiplexer 321, a beacon detector 322, an interference detector 324, a resource assigner 326, a resource hopper 328, and a pedestrian probability calculator 330. The aforementioned structure and/or software (depending on the manner of implementation to manage automotive radar coordination) of FIG. 3 is communicatively connected (and/or interconnected) by a radar unit bus 332.

The example antenna 302 of the illustrated example of FIG. 3 is communicatively connected to the example duplexer 310 of the example radar unit 300. The example antenna 302 is used by the example radar unit 300 to send and receive RF signals. In some examples, the example antenna 302 is implemented by a parabolic antenna. In further examples, the example antenna 302 can be implemented by, but not limited to, a corner reflector antenna, a horn antenna, or a lens antenna. In some examples, the example antenna 302 is located within the vehicle (e.g., the example vehicle 100 of FIG. 1). In further examples, the example antenna 302 is located on the external surface of the vehicle.

The example GPS antenna 304 of the illustrated example of FIG. 3 is accessed by the example GPS accessor 313 of the example radar unit 300. The example GPS antenna 304 communicates GPS information (e.g., global time and position information) to the example radar unit 300. In the example disclosed herein, the example GPS antenna 304 is located externally of the GPS navigation device. The example GPS antenna 304 can be located within or on the external surface of the vehicle. In further examples, the example GPS antenna 304 is located within the GPS navigation device (not illustrated) of the vehicle. Furthermore, the example GPS antenna 304 may be implemented using a passive antenna or an active (e.g., amplified) antenna.

The example image sensor 306 of the illustrated example of FIG. 3 is accessed by the example image accessor 314 of the example radar unit 300. The example image sensor 306 captures images at a variable sensing rate controlled by the example image accessor 314. In the example disclosed herein, the example image sensor 306 is implemented by analog sensors. The analog sensors used may include semiconductor charge-coupled devices (CCD), active pixel sensors in complementary metal-oxide-semiconductor (CMOS), or N-type metal-oxide-semiconductor (NMOS) technologies. In further examples, the example image sensor 306 is implemented by digital sensors. In some examples, the example image sensor 306 includes a mechanical shutter or an electronic shutter to control the exposure time.

The example duplexer 310 of the illustrated example of FIG. 3 is communicatively connected to and switches between the example transmitter 308 and the example receiver 312 of the example radar unit 300. In some examples, the example duplexer 310 is connected to the example transmitter 308, enabling the example radar unit 300 to transmit RF signals via the example antenna 302. In some examples, the example duplexer 310 is connected to the example receiver 312, allowing the example radar unit 300 to receive RF signals via the example antenna 302. In the example disclosed herein, the example duplexer 310 is implemented by a transmit-receive switch. In further examples, the example duplexer 310 may also be implemented by a circulator or hybrid coil.

The example GPS accessor 313 of the illustrated example of FIG. 3 accesses GPS information via the example GPS antenna 304, such as global time and position information. In some examples, the example GPS accessor 313 implements means for accessing GPS information (e.g., time information, current vehicle position information, etc.) The example GPS accessor 313 is implemented by a logic circuit, such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), programmable controller(s), Graphics Processing Unit(s) (GPU(s)), digital signal processor(s) (DSP(s)), Coarse Grained Reduced precision architecture (CGRA(s)), image signal processor(s) (ISP(s)), etc.

The example image accessor 314 of the illustrated example of FIG. 3 accesses images captured by the example image sensor 306. The example image accessor 314 is implemented by a logic circuit, such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example image analyzer 315 of the illustrated example of FIG. 3 is communicatively connected to the example image accessor 314 via the example radar unit bus 332. The example image analyzer 315 receives images from the example image accessor 314 and analyzes the image using any image analysis algorithm to detect pedestrian presence. The example image analyzer 315 is implemented by a logic circuit, such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example resource manager 316 of the illustrated example of FIG. 3 performs an initial setup process of the example radar unit 300, including assigning a unit ID, saving the current time and position information of the example radar unit 300, and obtaining the radar unit requirements. The example resource manager 316 accesses both the example radar unit database 318 and the example frequency blacklist database 320. In some examples, the example resource manager 316 implements means for retrieving radar unit requirements (e.g., a unit ID, current time information, vehicle position information, and radar resource requirements). The example resource manager 316 is implemented by a logic circuit, such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example radar unit database 318 of the illustrated example of FIG. 3 stores the unique radar unit ID and requirements of the example radar unit 300 (e.g., latency requirements, frequency requirements, etc.), the time and position information from the example GPS antenna 304, the vehicle information (e.g., vehicle velocity) of the example vehicle 100, and the radar resource map created by the example resource multiplexer 321. The example radar unit database 318 is implemented by any memory, storage device and/or storage disc for storing data such as, for example, flash memory, magnetic media, optical media, solid state memory, hard drive(s), thumb drive(s), etc. Furthermore, the data stored in the example radar unit database 318 may be in any data format such as, for example, binary data, comma delimited data, tab delimited data, structured query language (SQL) structures, etc. While, in the illustrated example, the example radar unit database 318 is illustrated as a single device, the example radar unit database 318 and/or any other data storage devices described herein may be implemented by any number and/or type(s) of memories.

The example frequency blacklist database 320 of the illustrated example of FIG. 3 stores frequencies from the example radar resource map that are known to cause interference. The example frequency blacklist database 320 is implemented by any memory, storage device and/or storage disc for storing data such as, for example, flash memory, magnetic media, optical media, solid state memory, hard drive(s), thumb drive(s), etc. Furthermore, the data stored in the example frequency blacklist database 320 may be in any data format such as, for example, binary data, comma delimited data, tab delimited data, structured query language (SQL) structures, etc.

The example resource multiplexer 321 of the illustrated example of FIG. 3 performs time and frequency domain multiplexing based on the radar unit requirements stored in the example radar unit database 318. This creates a radar resource map (e.g., the example radar resource map 600 of FIG. 6) stored in the example radar unit database 318. In some examples, the example resource multiplexer 321 implements means for performing time multiplexing and frequency multiplexing according to the radar resource requirements. The example resource multiplexer 321 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

Figure 9:
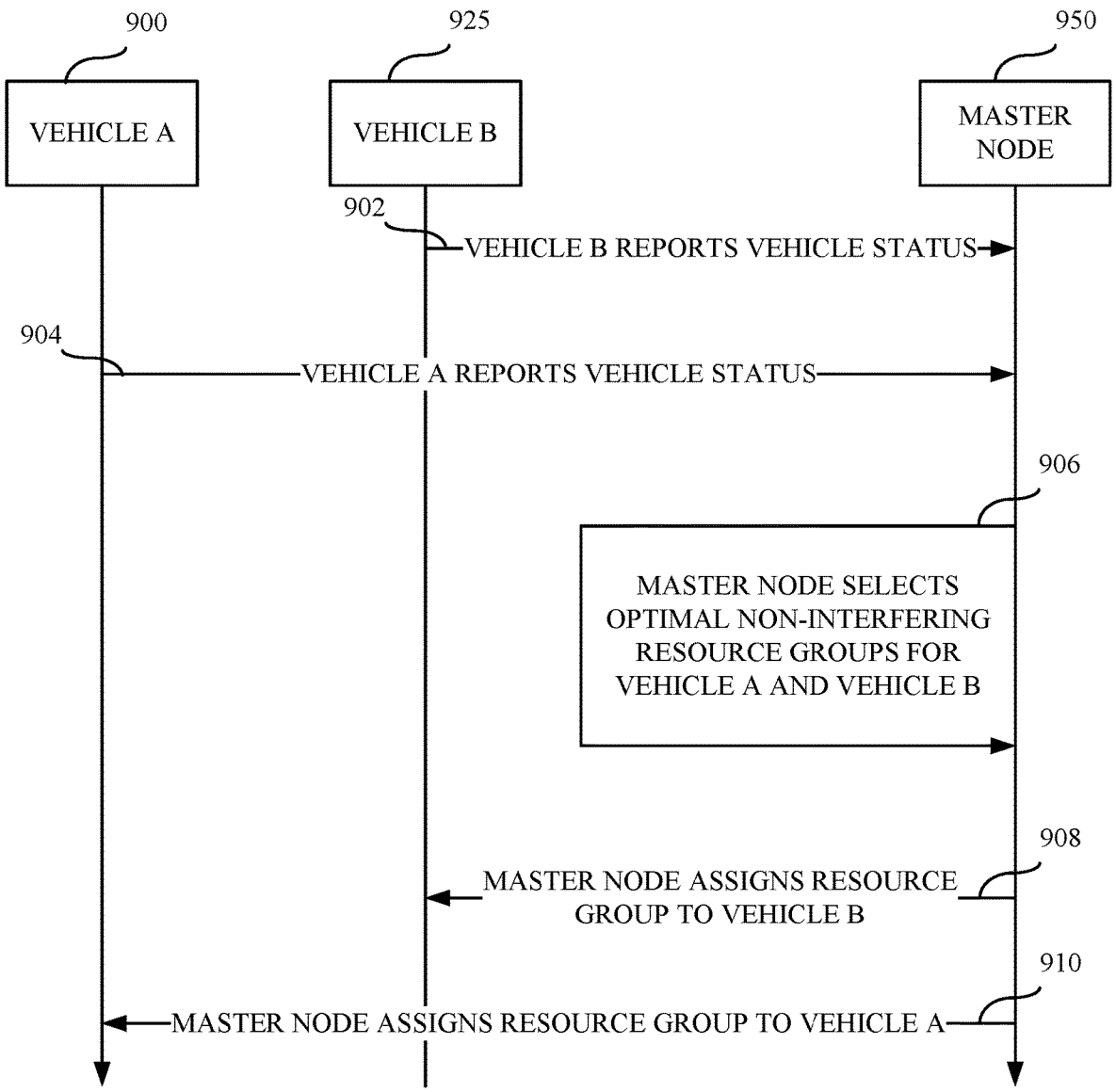
FIG. 9 is an illustration of example vehicle-to-everything (V2X) communication to manage automotive radar coordination.

The example beacon detector 322 of the illustrated example of FIG. 3 detects beacons from other vehicles or external nodes (e.g., the example master node 950 of FIG. 9). In examples disclosed herein, the beacons detected by the example beacon detector 322 are used to determine whether to coordinate radar resource groups with other vehicles and to share the radar resource groups chosen. The example beacon detector 322 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

Figure 6:
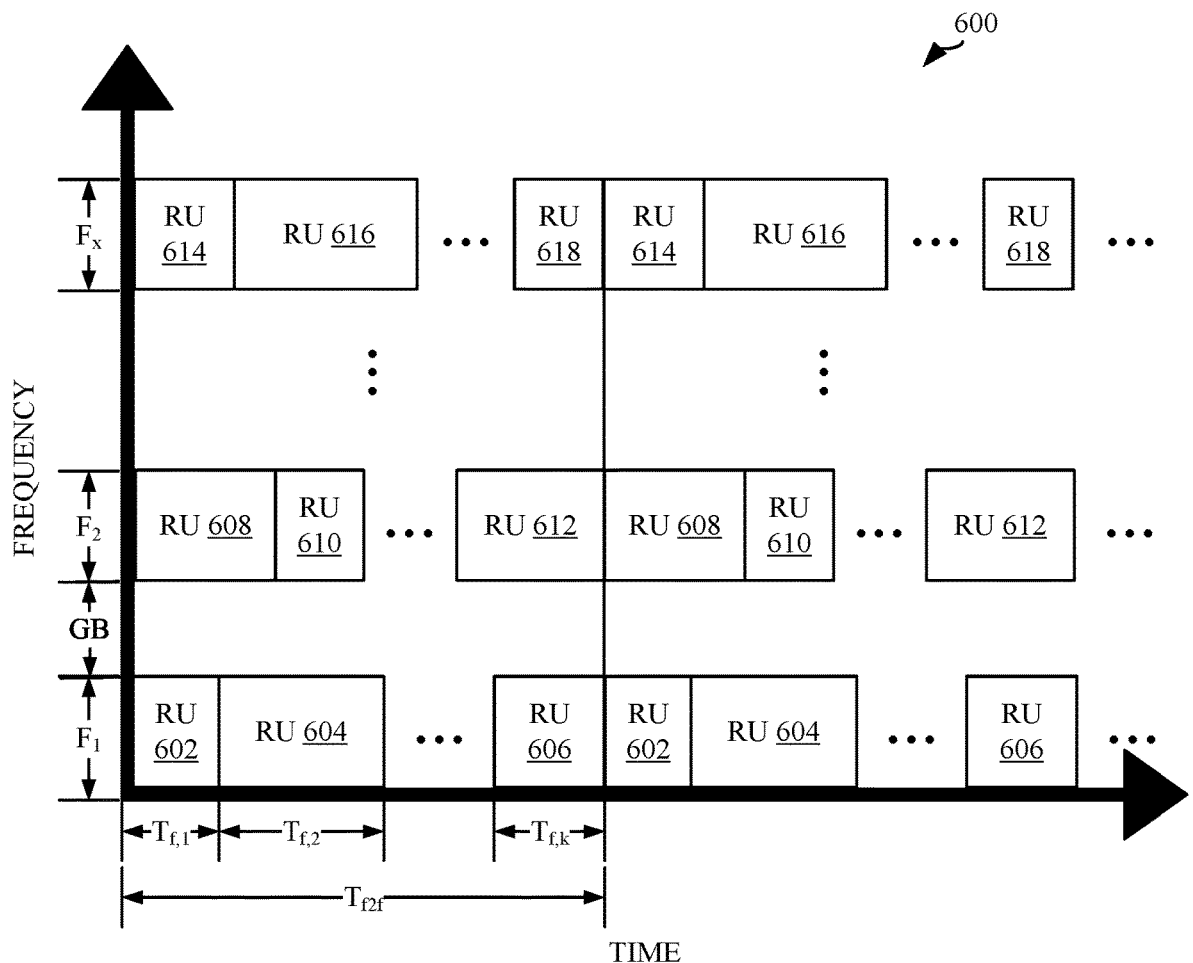
FIG. 6 is an illustration of an example radar resource allocation map.

The example resource assigner 326 of the illustrated example of FIG. 3 assigns the radar units of a vehicle (e.g. the example vehicle 100 of FIG. 1) to a radar resource group based on the radar resource allocation map (e.g., the example radar resource allocation map of FIG. 6). In some examples, the example resource assigner 326 assigns the radar units of a vehicle to a group randomly on the radar resource allocation map. The example resource assigner 326 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example resource hopper 328 of the illustrated example of FIG. 3 performs resource hopping in some examples when interference is detected. In the example disclosed herein, the example resource hopper 328 first performs any number of frequency hops and then any number of time hops until interference is not detected. In some examples, the example resource hopper 328 will change the hopping process and report an error message if interference remains after a predetermined number of hops. In some examples, the example resource hopper 328 also checks for a hidden node problem and/or determines whether the interference is early. In some examples, the example resource hopper 328 implements means for hopping along frequency and time in response to detecting an amount of interference that exceeds an interference threshold. The example resource hopper 328 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example frequency/time counter 329 of the illustrated example of FIG. 3 counts the number of frequency hops and time hops performed by the example resource hopper 328. The example frequency/time counter 329 increments a frequency count by one every time a frequency hop is performed by the example resource hopper 328. The example frequency/time counter 329 increments a time count by one every time a time hop is performed by the example resource hopper 328. In some examples, the example frequency/time counter 329 is implemented by an asynchronous counter. In further examples, the example frequency/time counter 329 can also be implemented by a synchronous counter, an asynchronous or synchronous decade counter, and an asynchronous or synchronous up-down counter.

The example pedestrian probability calculator 330 of the illustrated example of FIG. 3 uses the current vehicle information (e.g., position, time, velocity, etc.) retrieved by the example resource manager 316 to calculate the probability of pedestrian presence. The example pedestrian probability calculator 330 uses pedestrian focused pre-knowledge of locations (e.g., the example crosswalk 118) at specific time periods (e.g., business hours) to calculate the probability of pedestrian presence. In some examples, the example pedestrian probability calculator 330 implements means for calculating a probability of pedestrian presence based on at least one of the current time information and current vehicle position information. The example pedestrian probability calculator 330 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

While an example manner of implementing the radar unit 300 of FIG. 3 is illustrated in FIGS. 1, 2, and 3, one or more of the elements, processes and/or devices illustrated in FIGS. 1, 2, and 3 may be combined, divided, re-arranged, omitted, eliminated and/or implemented in any other way. Further, the example antenna 302, the example GPS antenna 304, the example image sensor 306, the example transmitter 308, the example duplexer 310, the example receiver 312, the example GPS accessor 313, the example image accessor 314, the example image analyzer 315, the example resource manager 316, the example radar unit database 318, the example frequency blacklist database 320, the example resource multiplexer 321, the example beacon detector 322, the example interference detector 324, the example resource assigner 326, the example resource hopper 328, the example frequency/time counter 329, the example pedestrian probability calculator 330 and/or, more generally, the example radar unit 300 of FIG. 3 may be implemented by hardware, software, firmware and/or any combination of hardware, software and/or firmware. Thus, for example, any of the example antenna 302, the example GPS antenna 304, the example image sensor 306, the example transmitter 308, the example duplexer 310, the example receiver 312, the example GPS accessor 313, the example image accessor 314, the example image analyzer 315, the example resource manager 316, the example radar unit database 318, the example frequency blacklist database 320, the example resource multiplexer 321, the example beacon detector 322, the example interference detector 324, the example resource assigner 326, the example resource hopper 328, the example frequency/time counter 329, the example pedestrian probability calculator 330 and/or, more generally, the example radar unit 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example antenna 302, the example GPS antenna 304, the example image sensor 306, the example transmitter 308, the example duplexer 310, the example receiver 312, the example GPS accessor 313, the example image accessor 314, the example image analyzer 315, the example resource manager 316, the example radar unit database 318, the example frequency blacklist database 320, the example resource multiplexer 321, the example beacon detector 322, the example interference detector 324, the example resource assigner 326, the example resource hopper 328, the example frequency/time counter 329, the example pedestrian probability calculator 330 and/or the radar unit 300 is/are hereby expressly defined to include a non-transitory computer readable storage device or storage disk such as a memory, a digital versatile disk (DVD), a compact disk (CD), a Blu-ray disk, etc. including the software and/or firmware. Further still, the example radar unit 300 of FIG. 3 may include one or more elements, processes and/or devices in addition to, or instead of, those illustrated in FIGS. 1, 2, and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
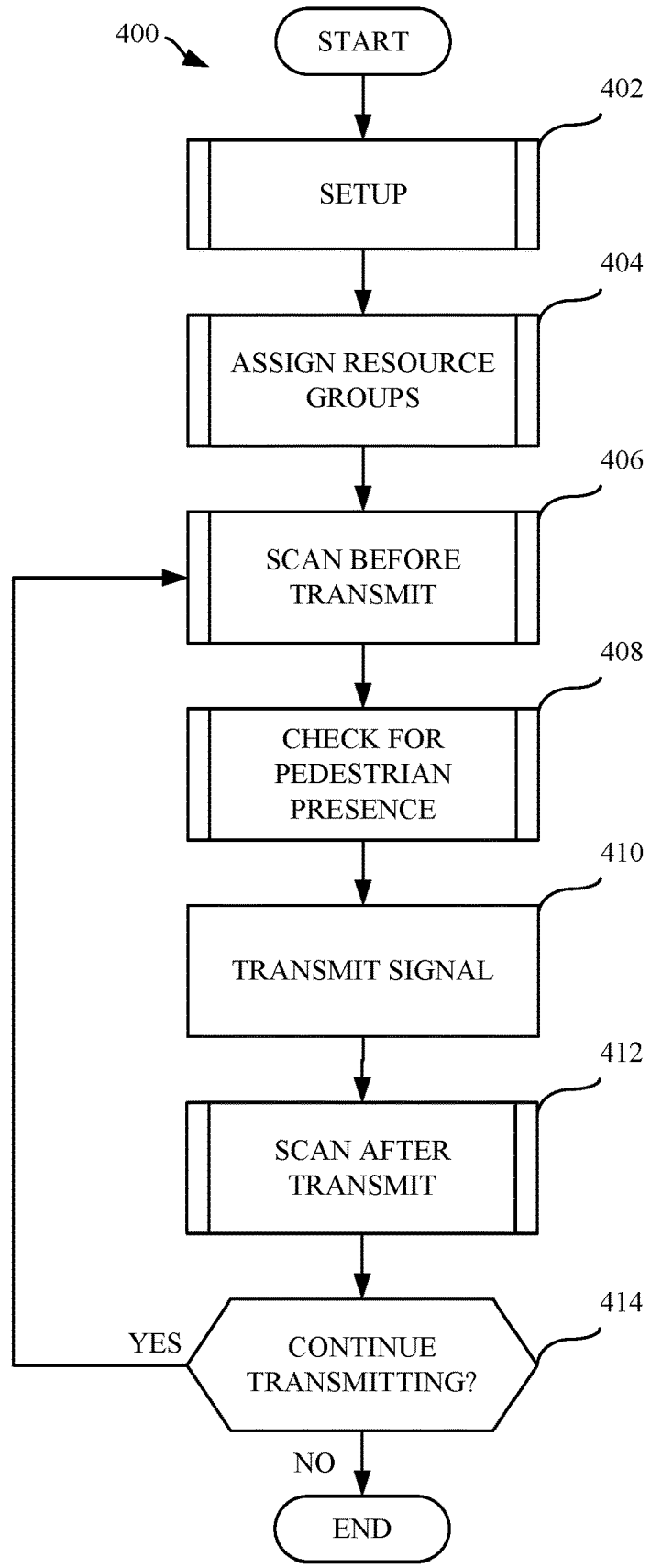
FIG. 4 is a flowchart representative of example machine readable instructions which may be executed to implement the example radar unit of FIG. 3 to manage automotive radar coordination.

A flowchart representative of example hardware logic, machine readable instructions, hardware implemented state machines, and/or any combination thereof for implementing the radar unit 300 of FIG. 3 is shown in FIG. 4. The machine-readable instructions may be one or more executable programs or portion(s) of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIGS. 4-5, 7, and 11-14, many other methods of implementing the example radar unit 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-5, 7, and 11-14 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 describes example machine readable instructions which may be executed to implement the example radar unit of FIG. 3 to manage automotive radar coordination. The example process 400 of the illustrated example of FIG. 4 begins when the vehicle is powered on. The resource manager 316 performs an initial setup process. (Block 402). The example setup process includes assigning a unit ID and obtaining radar unit requirements, obtaining and saving the current time and vehicle position information, and performing resource multiplexing. An example implementation of the setup process 402 of FIG. 4 is described in further detail in connection with FIG. 5, below. The example resource manager 316 assigns resource groups for each vehicle according to the radar resource map (e.g., the example radar resource map 600) stored in the example radar unit database 318. (Block 404). The example radar resource assignment process includes determining whether to coordinate with other vehicles and assigning co-located radar units to resource groups on the radar resource map. An example implementation of the resource assignment process 404 of FIG. 4 is described in further detail in connection with FIG. 7, below. The example receiver 312 scans before transmitting a RF signal. (Block 406). The scanning process 406 includes detecting interferences and performing resource hops when interferences are detected. An example implementation of the scanning process 406 of FIG. 4 is described in further detail in connection with FIG. 11, below. The example resource manager 316 checks for pedestrian presence. (Block 408). The pedestrian presence checking process includes calculating the probability of pedestrian presence based on GPS-based pre-knowledge and camera images and updating an image sensing rate in response to the pedestrian presence probability. An example implementation of the pedestrian presence checking process 408 of FIG. 4 is described in further detail in connection with FIG. 13, below. The example transmitter 308 then transmits a RF signal. (Block 410). The example receiver 312 scans after transmitting a RF signal. (Block 412). The scanning after transmitting process includes detecting corruption and determining whether to immediately retry transmission. An example implementation of the scanning after transmission process 412 of FIG. 4 is described in further detail in connection with FIG. 14, below. The example resource manager 316 determines whether the radar units of the example vehicle 100 should continue transmitting. (Block 414).

Figure 5:
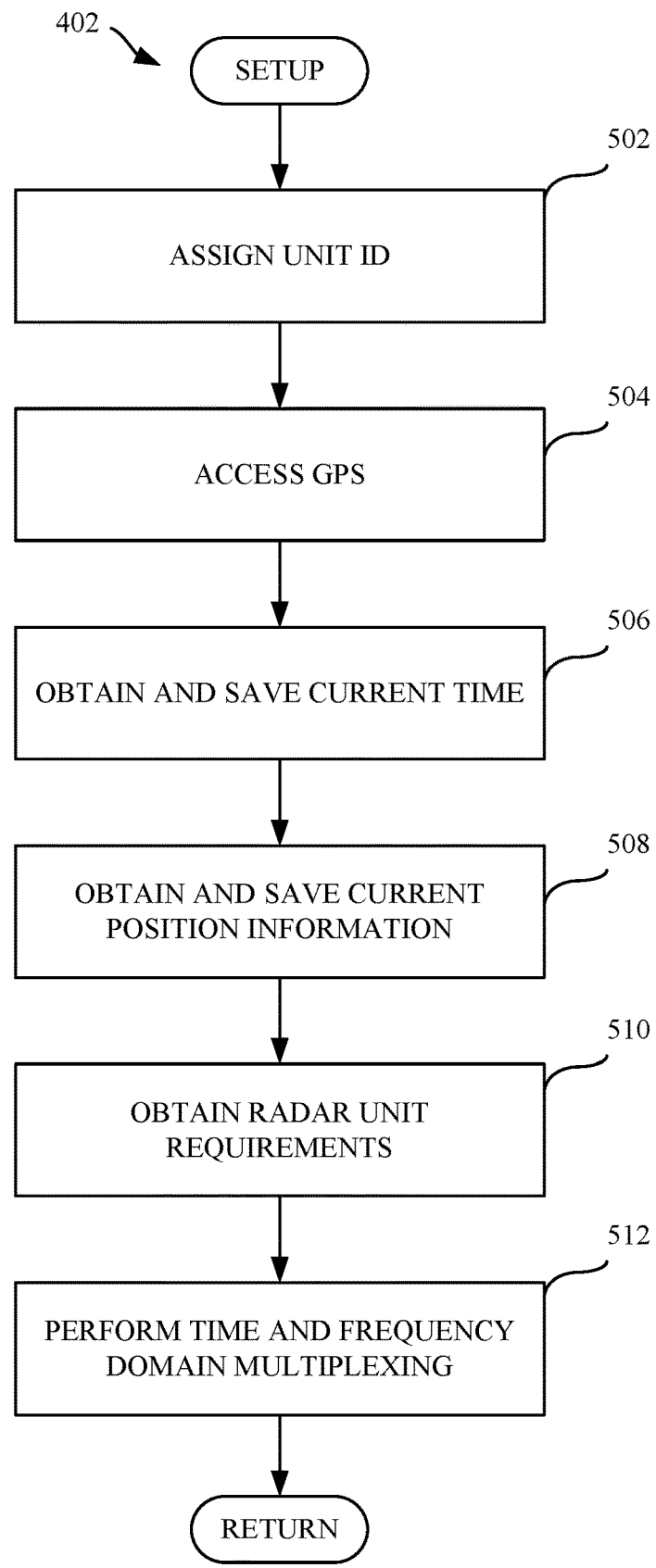
FIG. 5 is a flowchart representative of example machine readable instructions which may be executed to implement the example radar resource manager of FIG. 3 to setup the example radar unit of FIG. 3.

FIG. 5 describes example machine readable instructions which may be executed to implement the example resource manager 316 of FIG. 3 to setup the example radar unit 300 of FIG. 3. The example process of FIG. 5 begins when the example resource manager 316 stores a unique unit ID in the example radar unit database 318. (Block 502). The example GPS accessor 313 accesses the example GPS antenna 304. (Block 504). Although the example radar unit 300 is illustrated with an example GPS antenna 304, other methods of implementing the example radar unit 300 may be additionally or alternatively used. For example, a geographic information system (GIS) may be used in place of the example GPS antenna 304. The GPS accessor 313 obtains the current time from the example GPS antenna 304 and the example resource manager 316 saves the current time to the example radar unit database 318. (Block 506). The GPS accessor 313 also obtains the current position information of the vehicle from the example GPS antenna 304 and the example resource manager 316 saves the current position information to the example radar unit database 318. (Block 508).

The example resource manager 316 obtains the radar unit requirements from the radar unit database 318. (Block 510). In some examples, radar unit requirements include but are not limited to key performance indicators (e.g., speed, range, etc.) and sets of resources (e.g., bandwidth, time duration, etc.). In the example disclosed herein, the example resource multiplexer 321 performs time and frequency domain multiplexing to form and store a radar resource map in the example radar unit database 318. (Block 512). The unique unit ID of each radar unit stored in the example radar unit database 318 is used as a seed for a long polynomic pseudo random generator in the example multiplexing schemes. In some examples, the example resource multiplexer 321 can perform additional multiplexing schemes, including code-domain multiplexing.

FIG. 6 is an illustration of an example radar resource allocation map 600. In the example disclosed herein, the radar resource allocation map divides the time and frequency resources into a predefined map/grid. In some examples, time-domain multiplexing performed by the example resource multiplexer 321 is used to assign radar units (e.g., the example radar unit 602 of FIG. 6) to specific time periods on the example radar resource allocation map 600. In some examples, the radar unit requirements obtained in block 510 of FIG. 5 include the radar unit's frame-to-frame interval ($T_{f2f}$), which is the overall time period (including the time period the radar unit is actively transmitting ($T_f$)) until the radar unit repeats a transmission. In the example disclosed herein, the example resource multiplexer 321 assigns additional radar units (e.g., the example radar unit 604) to the unused time in $T_{f2f}$ that the first radar unit (e.g., the example radar unit 602) is not actively transmitting. In the illustrated example of FIG. 6, K number of radar units actively transmit within the $T_{f2f}$ interval (e.g., the example radar unit 602 actively transmits for $T_{f,1}$, the example radar unit 604 transmits for $T_{f,2}$, and the $K^{th}$ example radar unit 606 transmits for $T_{f,k}$). This group of radar units (e.g., the example radar unit 602, the example radar unit 604, and the $K^{th}$ example radar unit 606) repeat at the next $T_{f2f}$ interval at the same frequency $F_1$.

In the illustrated example of FIG. 6, the example resource multiplexer 321 also performs frequency-domain multiplexing. The example resource multiplexer 321 assigns additional radar units (e.g., the example radar unit 608, the example radar unit 610, and the example radar unit 612) operating in the $T_{f2f}$ interval but at interfering times with the first set of radar units operating at the first frequency $F_1$ (the example radar unit 602, the example radar unit 604, and the $K^{th}$ example radar unit 606) to a second frequency $F_2$. In some examples, an example guard band (GB) is used to separate the two assigned frequencies $F_1$ and $F_2$ to further prevent frequency interference. In the example disclosed herein, the example resource multiplexer 321 assigns radar units to X number of frequencies (e.g., the example radar unit 614, the example radar unit 616, and the example radar unit 618 operate at frequency $F_x$). The example radar resource allocation map 600 allows each individual radar unit to operate in non-overlapping (e.g., orthogonal) time/frequency resources. For example, the example radar unit 602 and the example radar unit 608 have different but overlapping active transmitting time periods $T_f$ but operate at different frequencies $F_1$ and $F_2$ such that they are non-interfering.

Figure 7:
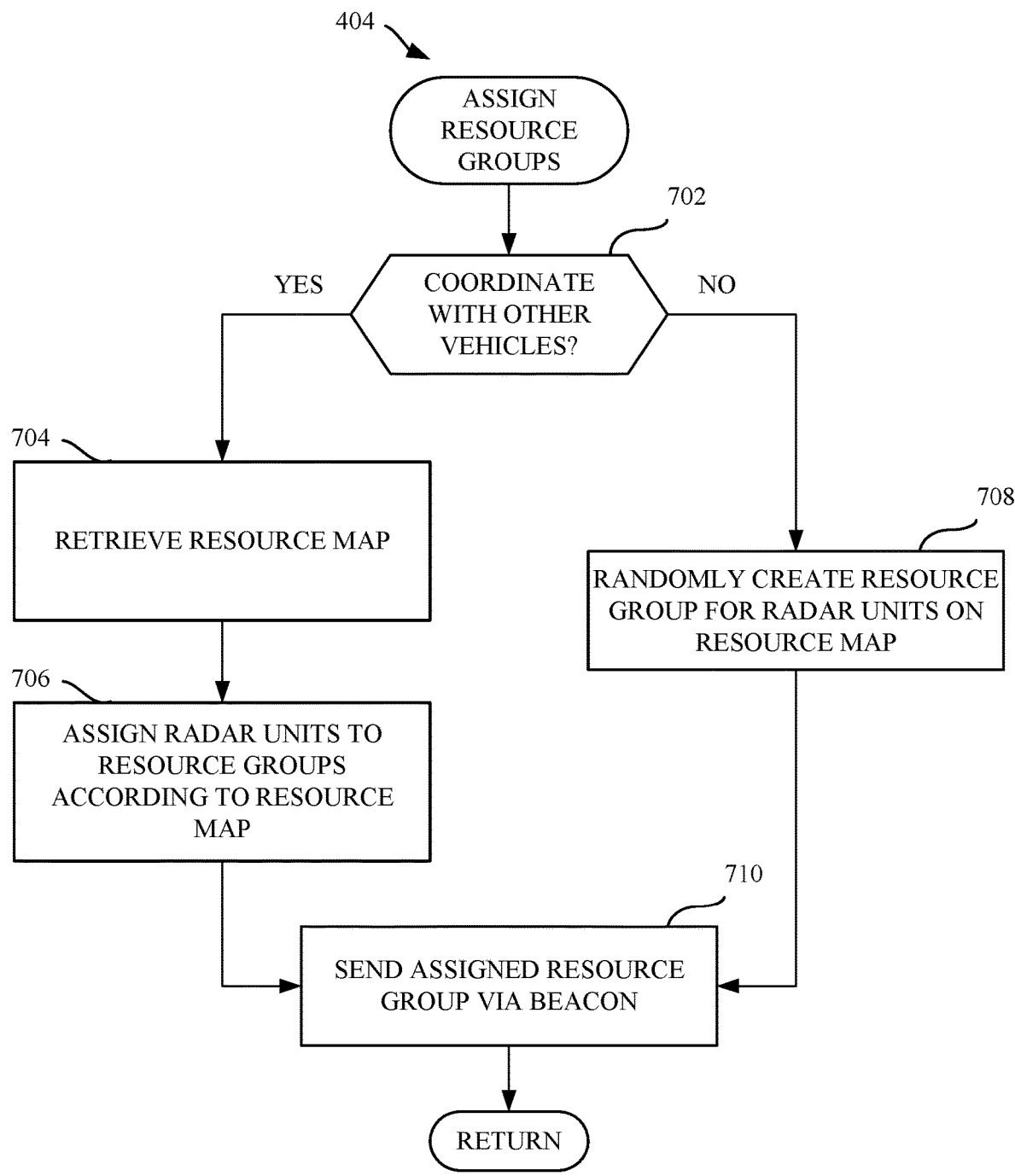
FIG. 7 is a flowchart representative of example machine readable instructions which may be executed to implement the example beacon detector of FIG. 3 to assign example radar units to resource groups on the radar resource map.

FIG. 7 describes example machine readable instructions which may be executed to implement the example beacon detector 322 of FIG. 3 to assign radar units (e.g., example radar units 102-112 of FIG. 1) to resource groups on the radar resource map. The radar resource groups group the radar units on the same platform (e.g., having direct communication and/or coordination) that are using the same spatial resources together (e.g., radar units of a single vehicle). The radar resource groups simplify the distributed time-frequency negotiation and selection process for automotive radar coordination.

The example beacon detector 322 determines whether to coordinate resource grouping with other vehicles. (Block 702). If the example beacon detector 322 determines that resource groupings are to be coordinated with other vehicles (e.g., block 702 returns a result of YES), the example resource manager 316 retrieves the radar resource map from the example radar unit database 318. (Block 704). The example resource assigner 326 assigns the example radar units (e.g., example MRR units 102-108 and example LRR units 110-112) to available space on the radar resource map. (Block 706). If the example beacon detector 322 decides not to coordinate with other vehicles (e.g., block 702 returns a result of NO), the example resource assigner 326 randomly assigns the example radar units (e.g., example MRR units 102-108 and example LRR units 110-112) to the radar resource map. (Block 708).

The example resource assigner 326 sends the assigned radar resource group of each radar unit (e.g., example radar unit 300) via beacon and returns to program 400 of FIG. 4. (Block 710). In some examples, the example radar unit 300 only sends its radar resource group via beacon when at least one other vehicle is present (e.g., within radar range). For example, the example radar unit 300 may only sends its radar resource group via beacon when at least one other vehicle including examples of the present invention is present. However, in some examples this step can occur regardless of whether other vehicles including examples of the present invention are present or even not occur at all. In the example disclosed herein, the example resource assigner 326 is illustrated as a component of the example radar unit 300. In some examples, the example resource assigner 326 can be an entirely separate component located on or within the example vehicle 100. In some examples, the example resource assigner 326 can be an external component separate from the example vehicle 100 (e.g., the master node 950 of FIG. 9).

In the example disclosed herein, individual radar units also send their assigned position (e.g., time and frequency slots) via beacon to the other in-vehicle radar units (e.g., within the same radar resource group). This communication is used when one radar unit replaces the position of another radar unit located within the same vehicle (e.g., the example vehicle 100 turns right, causing the example MRR unit 104 to replace the location of the example LRR unit 110). Because the individual radar units are able to identify the position of the other radar units within the same radar resource group on the radar resource map, the co-located radar unit can adapt the radar resource allocation of the other radar unit it replaced (e.g., the example MRR unit 104 is assigned the time and frequency position of the example LRR unit 110 after the example vehicle 100 turns right). This simplifies radar unit coordination and saves time and energy from completely reassigning radar units to a new position on the radar resource map.

Figure 8:
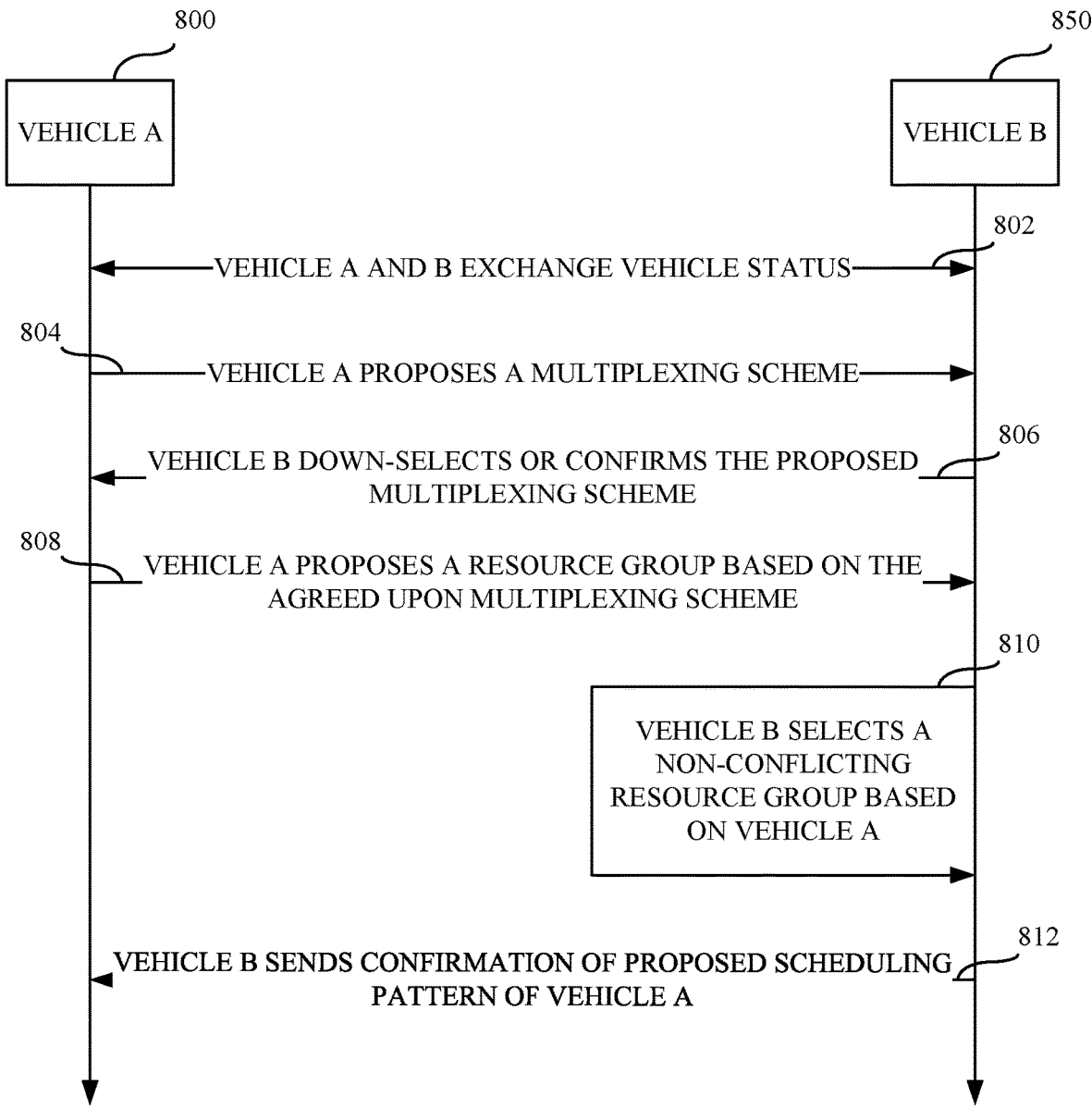
FIG. 8 is an illustration of example vehicle-to-vehicle (V2V) communication to manage automotive radar coordination.

FIG. 8 is an illustration of example vehicle-to-vehicle (V2V) communication to manage automotive radar coordination. In some examples, this process occurs when block 702 of FIG. 7 returns a result of YES. In the illustrated example of FIG. 8, the example vehicle A 800 and the example vehicle B 850 exchange their respective vehicle statuses (e.g., position, radar unit requirements, etc.). (Message 802). In some examples, the example vehicle A 800 and the example vehicle B 850 communicate via beacons using the example antenna 302 and the example beacon detector 322 of FIG. 3. The example vehicle A 800 proposes a multiplexing scheme (e.g., time-domain multiplexing, frequency-domain multiplexing, code-domain multiplexing, etc.) to the example vehicle B 850. (Message 804). The proposed multiplexing scheme can include any number and/or combination of multiplexing schemes. The example vehicle B 850 down-selects or confirms the proposed multiplexing scheme from the example vehicle A 800. (Message 806). The example vehicle A 800 then proposes and assigns a radar resource group for the radar units of the example vehicle A 800 using the agreed upon multiplexing scheme. (Message 808). The example vehicle B 850 then assigns a non-conflicting radar resource group based on the radar resource group selected by the example vehicle A 800. (Message 810). In some examples, the example resource assigner 326 of FIG. 3 assigns the radar resource group for the example vehicle A 800 and the example vehicle B 850. The example vehicle B 850 sends confirmation of the proposed scheduling pattern to the example vehicle A 800. (Message 812).

FIG. 9 is an illustration of example vehicle-to-everything (V2X) communication to manage automotive radar coordination. In some examples, this process occurs when block 702 of FIG. 7 returns a result of YES. In the illustrated example of FIG. 9, the example vehicle B 925 reports its vehicle status to the example master node 950. (Message 902). The example vehicle A 900 also reports its vehicle status to the example master node 950. (Message 904). In some examples, the example vehicle A 900 and the example vehicle B 925 report their vehicle status to the example master node 950 via the example antenna 302. The example master node 950 selects optimal non-interfering radar resource groups for both the example vehicle A 900 and the example B 925 using any resource multiplexing scheme based on the reported vehicle statuses. (Message 906). The example master node 950 assigns and communicates a radar resource group to the example vehicle B 925. (Message 908). The example master node 950 assigns and communicates a radar resource group to the example vehicle A 900. (Message 910). While the illustrated example of FIG. 9 includes two example vehicles and one master node, some examples may include any number of vehicles and/or any number of master nodes.

Figure 10:
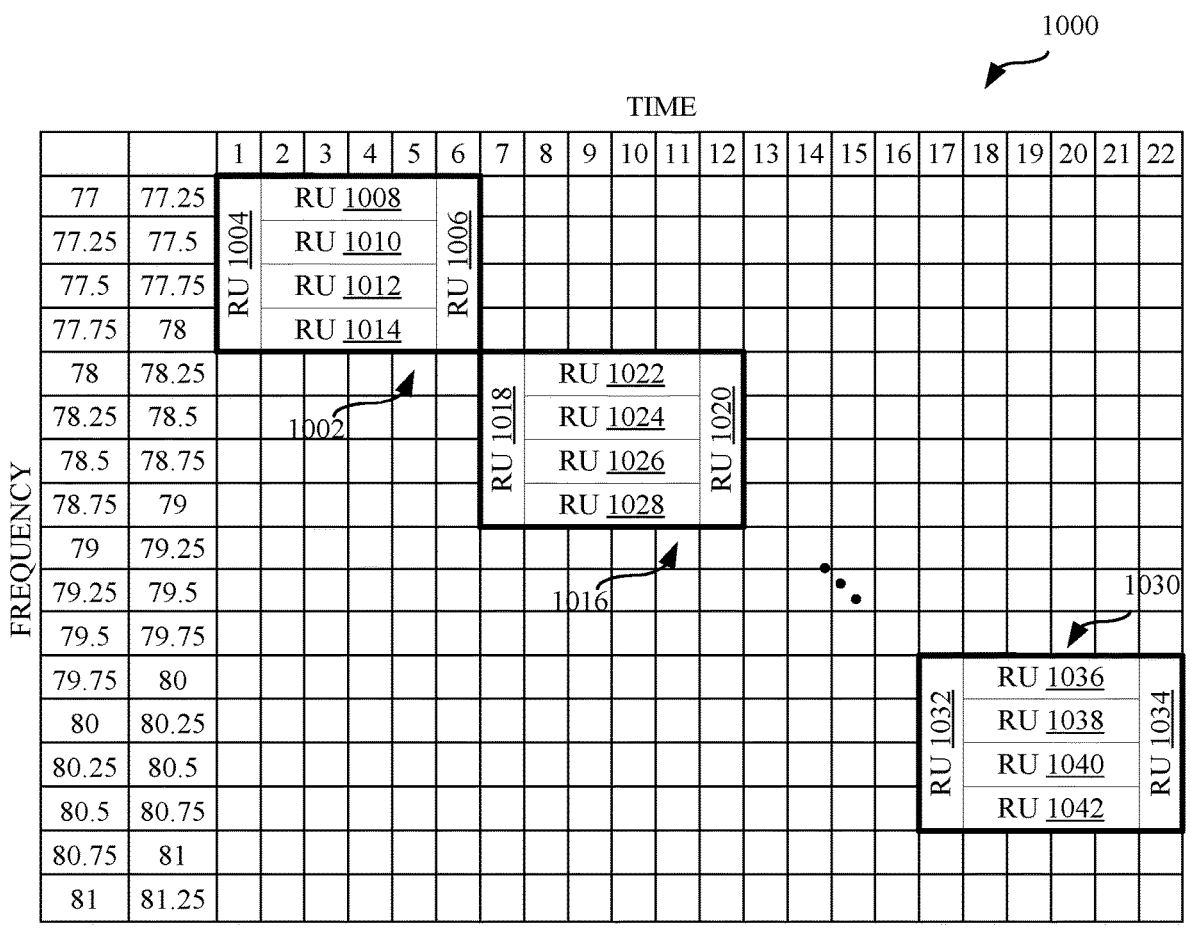
FIG. 10 is an illustration of example radar resource group assignments on a pre-allocated radar resource map.

FIG. 10 is an illustration of example radar resource group assignments on an example pre-allocated radar resource map 1000. The illustrated example of FIG. 10 includes an example first radar resource group 1002. In the example disclosed herein, the example radar resource group encompasses all the radar units in a single vehicle (e.g., the example MRR units 102-108 and the example LRR units 110-112 of FIG. 1). However, in some examples, radar resource groups can include any number of radar units. The example radar resource group 1002 includes the example radar units 1004, 1006, 1008, 1010, 1012, and 1014. In the example disclosed herein, the example radar units 1004 and 1006 are assigned to the same range of frequencies but at different times. Additionally, the example radar units 1008-1014 are assigned to the same time period but operate at different frequencies. However, in some examples, radar units can be assigned in any configuration (e.g., time, frequency). The illustrated example of FIG. 10 also includes a second radar resource group 1016 containing example radar units 1018, 1020, 1022, 1024, 1026, and 1028. The second example radar resource group 1016 is coordinated with the first radar resource group 1002 to occupy non-interfering time and frequencies on the example radar resource allocation map 1000. In some examples, this is coordinated by the example resource assigner 326 in block 706 of FIG. 7. While the example disclosed herein of FIG. 10 illustrates the example second radar resource group 1016 adjacent to the example first radar resource group 1002, in some examples the example radar resource groups 1002 and 1016 can be located anywhere on the example radar resource allocation map 1000. The example radar resource allocation map 1000 also includes a third radar resource group 1030 containing the example radar units 1032, 1034, 1036, 1038, 1040, and 1042. In some examples, the example radar resource allocation map 1000 can include any number of radar resource groups in any location.

Figure 11:
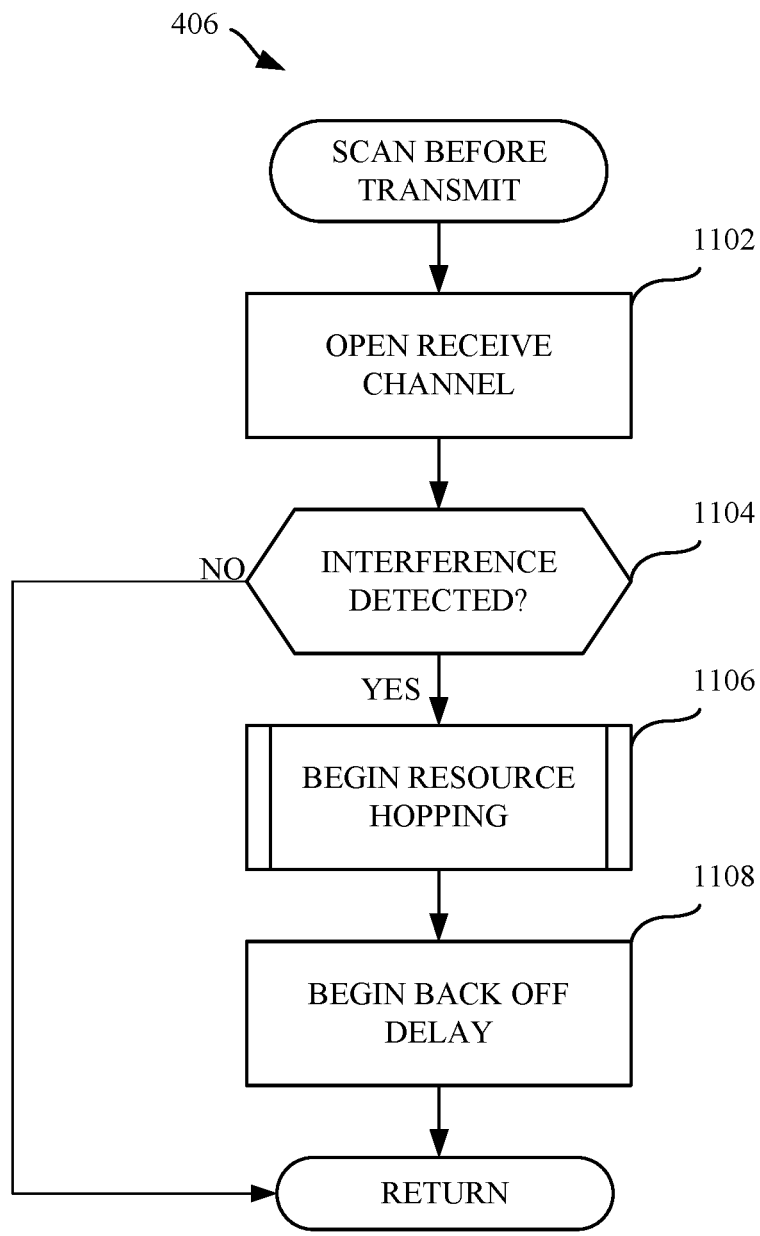
FIG. 11 is a flowchart representative of example machine readable instructions which may be executed to implement the example receiver of FIG. 3 to detect interferences.

Returning to the illustrated example of FIG. 4, the example receiver 312 scans before transmitting. (Block 406). FIG. 11 describes example machine readable instructions which may be executed to implement the example receiver 312 of FIG. 3 to detect interferences. The example duplexer 310 switches to the example receiver 312 to enable the example antenna 302 to receive signals. (Block 1102). The example beacon detector 322 detects beacons received by the example receiver 312 and applies a detection process to map the entire spatial area covered by the example radar unit 300. In the example disclosed herein, it is assumed that the example beacon detector 322 has the ability to scan the entire frequency range used by other vehicles (e.g., the example vehicles 200 and 250). Additionally, the example beacon detector 322 uses a detection process to adaptively adjust and/or fine-tune the scan interval based on the measured environmental signal-to-noise ratio.

In some examples, the example radar unit 300 uses explicit scanning when there is at least one other vehicle present including an example of the present invention. Explicit scanning enables the example receiver 312 for short, predetermined durations due to the assumption that the other vehicles are also operating on predetermined intervals that are aligned to the same time anchor point. For example, vehicles including an example of the present invention are preconfigured to operate on the same global time anchor point with predetermined time intervals. Explicit scanning reduces power consumption due to the fact that the example receiver 312 is only enabled periodically. However, in some examples the example radar unit 300 uses implicit scanning. Implicit scanning assumes that other vehicles present may not be aligned to the same time anchor and therefore must scan continuously (e.g., the example receiver 312 is always enabled during block 406). While implicit scanning is not as energy efficient as explicit scanning, the example disclosed herein assumes the use of very low power RF signal detectors to mitigate the continuous use. The example disclosed herein can use explicit scanning, implicit scanning, or a combination of both. For example, the example radar unit 300 can use explicit scanning initially but switch to implicit scanning if a predetermined number of interferences are detected.

Figure 12:
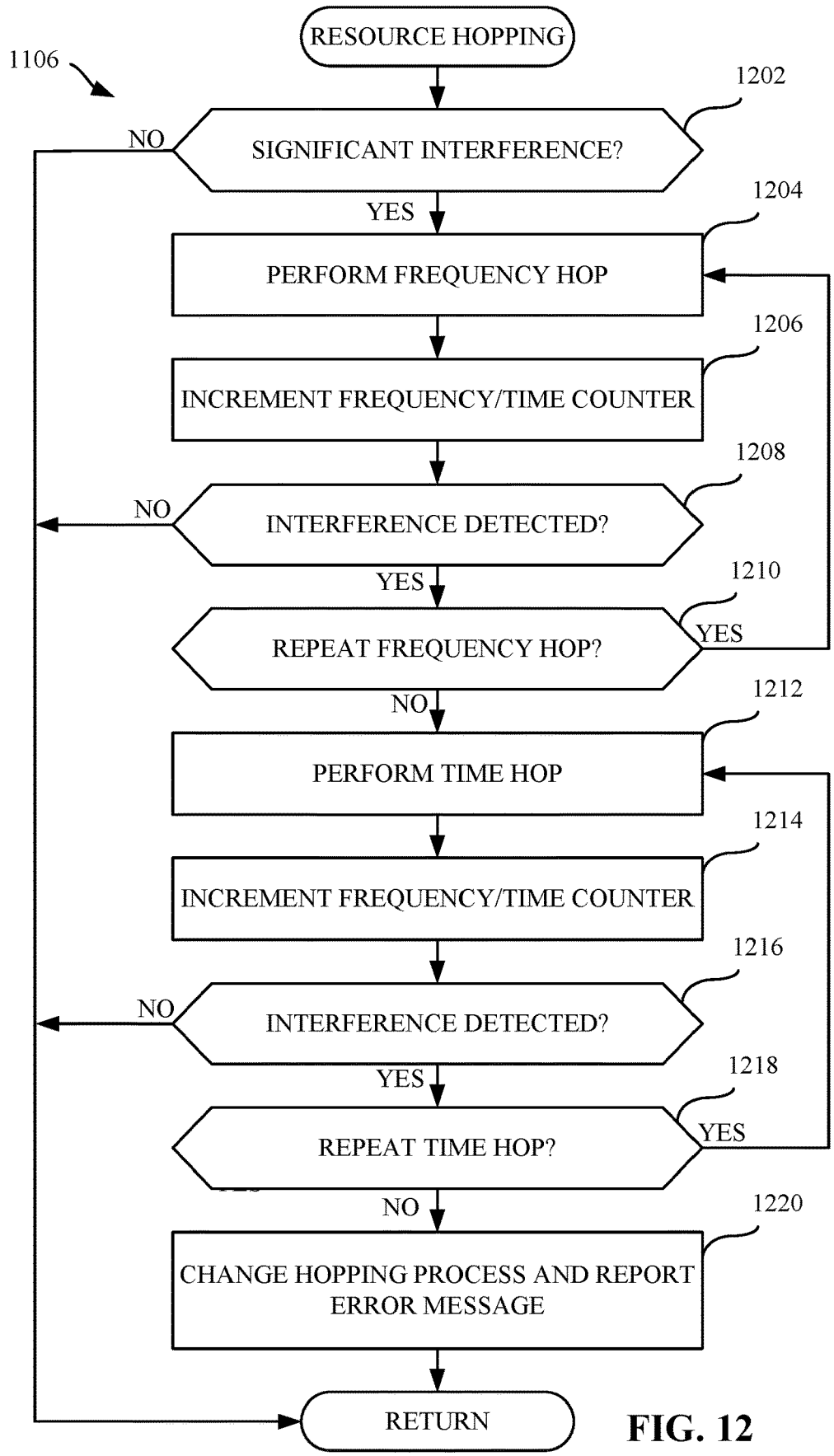
FIG. 12 is a flowchart representative of example machine readable instructions which may be executed to implement the example resource hopper of FIG. 3 to hop to different locations on the radar resource map of FIG. 10.

The example interference detector 324 accesses any signals received by the example antenna 302 and determines whether interference associated with the selected radar resource group (e.g., the example radar resource group 1002) is detected. (Block 1104). If the example interference detector 324 determines that interference is not detected (e.g., block 1104 returns a result of NO), the example radar unit 300 returns to program 400 of FIG. 4. If the example interference detector 324 determines that interference is detected (e.g., block 1104 returns a result of YES), the example resource hopper 328 begins resource hopping. (Block 1106). In some examples, the example interference detector 324 detects interference based on predetermined time period estimates for receiving a reflected RF signal. For example, if the example receiver 312 receives a RF signal for longer than the predetermined time estimate, the example interference detector 324 determines that some of the received RF signal came from an external radar unit and interference is present. However, some examples may use any other radar interference detection method. FIG. 12 illustrates additional detail associated with resource hopping of block 1106.

The example interference detector 324 determines whether a detected interference is significant. (Block 1202). In examples disclosed herein, a "significant" interference is when the amount of interference detected does not meet or exceed a significant interference threshold. In some examples, the significant interference threshold depends on whether the interference is a time interference or frequency interference. In examples disclosed herein, the example interference detector 324 avoids deadlocks (e.g., radar resource group "hops" to another location on radar resource map, followed by the interfering radar resource group hopping to the same new location) by measuring interferences using a hysteresis analysis. This hysteresis analysis can include, but is not limited to, requiring a certain number of consecutive interferences in the same resource map location (e.g., same time and frequency) and/or requiring a certain amount of overlapping interference time.

If the example interference detector 324 determines that the interference is not significant (e.g., block 1202 returns a result of NO), the example radar unit 300 returns to subprocess 406 of FIG. 11. If the example interference detector 324 determines that the interference is significant (e.g., block 1202 returns a result of YES), the example resource hopper 328 performs a frequency hop. (Block 1204). In examples disclosed herein, the resource manager 316 obtains the radar unit ID to use as a unique seed to calculate a random frequency to hop to. The example resource manager 316 accesses the frequency blacklist database 320 to check for known interference frequencies. The example frequency blacklist database 320 may include occupied frequencies collected in block 406, occupied frequencies of radar units within the same resource group (e.g., other radar units within the same vehicle), and known frequency combinations that lead to intermodulation distortion. In some examples, the example frequency blacklist database 320 can also contain other known frequency distortions and/or harmonic interferences. The example resource hopper 328 selects a new frequency after confirming with the example frequency blacklist database 320 via the example resource manager 316 that there is no known interference. The example frequency/time counter 329 then increments the number of frequency hops performed. (Block 1206).

The example interference detector 324 rechecks for interferences at the new location (e.g., new frequency) on the radar resource map of the radar resource group. (Block 1208). If the example interference detector 324 determines that there is no interference (e.g., block 1206 returns a result of NO), the example resource assigner 326 reassigns the radar resource group the new frequency and returns to subprocess 406 of FIG. 11. In examples disclosed hereinafter, the example interference detector 324 determines there is "no interference" when the amount of interference detected does not meet or exceed an interference threshold (e.g., the interference threshold defined in the hysteresis analysis of block 1202). If the interference detector 324 determines that there is still interference (e.g., block 1206 returns a result of YES), the example resource hopper 328 determines whether to perform another frequency hop. (Block 1210). If the example resource hopper 328 decides to perform another frequency hop (e.g., block 1210 returns a result of YES), the example resource hopper 328 returns to block 1204. In the examples disclosed herein, the example resource hopper 328 compares the number of frequency hops already performed (e.g., number of frequency hops stored in the example frequency/time counter 329) to a frequency hop threshold in order to determine whether to perform another frequency hop. In examples disclosed herein, the example resource hopper 328 can perform any number of repeated frequency hops as defined by the frequency hop threshold. In some examples, the number of repeated frequency hops is user defined. In some examples, the number of repeated frequency hops is pre-defined.

If the example frequency hopper 328 decides not to perform another frequency hop (e.g., block 1210 returns a result of NO), the example resource hopper 328 begins a time hop. (Block 1212). In the example described herein, the example resource hopper 328 uses a "guided guess" method by assigning the midpoint of the frame-to-frame interval as the new operating time. In some examples, the example resource hopper 328 randomly assigns a new operating time within the specified frame-to-frame interval. The example frequency/time counter 329 then increments the number of time hops performed. (Block 1214).

The example interference detector 324 determines if there is still interference at the new time point. (Block 1216). If the example interference detector 324 determines there is no interference (e.g., block 1216 returns a result of NO) the example resource assigner 326 reassigns the radar resource group the new operating time and returns to subprocess 406 of FIG. 11. If the example interference detector 324 determines there is interference (e.g., block 1216 returns a result of YES), the example resource hopper 328 determines whether to perform another time hop. (Block 1218). If the example resource hopper 328 decides to perform another time hop (e.g., block 1218 returns a result of YES), the example resource hopper 328 returns to block 1212. In the examples disclosed herein, the example resource hopper 328 compares the number of time hops already performed (e.g., number of time hops stored in the example frequency/time counter 329) to a time hop threshold in order to determine whether to perform another time hop. In the example disclosed herein, the subsequent time hops can be shifts before or after the initial time hop in increments of one quarter frame. In some examples the example resource hopper 328 can perform random time hops. In examples disclosed herein, the example resource hopper 328 can perform any number of repeated time hops as defined by the time hop threshold. In some examples, the number of repeated time hops is user defined. In some examples, the number of repeated time hops is pre-defined.

If the example resource hopper 328 decides to not perform another time hop (e.g., block 1218 returns a result of NO), the example resource hopper 328 reports an error message and changes radar resource groups via coding. (Block 1220). In some examples, the example resource assigner 326 returns to block 404 and reassigns new radar resource groups. In some examples, the example resource hopper 328 returns to block 1204 and repeats the resource hopping sequence with a new randomized hopping sequence.

In the example described herein, radar resource groups resource hop as a unit (e.g., individual radar units do not hop alone). However, in some examples, individual radar units (e.g., the example radar unit 300) in a radar resource group can be skewed in time from other radar units in a radar resource group as a result of time hopping (block 1212). In some examples, individual radar units within the same radar resource group are required to hop to the same time slot and/or use adjacent time slots whenever possible. Furthermore, to simplify hopping collision management, in example approaches disclosed herein, individual radar units in a radar resource group hop to and use the same frequency. However, in some examples individual radar units within the same radar resource group may hop to adjacent frequencies.

Further examples of resource hopping can include various other tests. In some examples, the example interference detector 324 can check for a hidden node problem. In some examples, the example interference detector 324 can determine if the interference is received prior to an interference time threshold (e.g., an early detection) and perform a time delay instead of proceeding with the resource hopping program. In some examples, these additional tests can be performed in any order. It is also to be understood that in some examples, the radar units may forgo resource hopping entirely or in part and risk interference due to latency limitations and requirements. The example radar unit 300 returns to subprocess 406 of FIG. 11.

The example resource manager 316 begins a back off delay. (Block 1108). In some examples, the back off delay is based on and aligned to the radar resource map (e.g., explicit). In some examples, the back off delay is purely random (e.g., implicit). In both examples of explicit and implicit back off delays, a maximum threshold delay time is predetermined in accordance with radar unit latency requirements. The example radar unit 300 returns to program 400 of FIG. 4.

Figure 13:
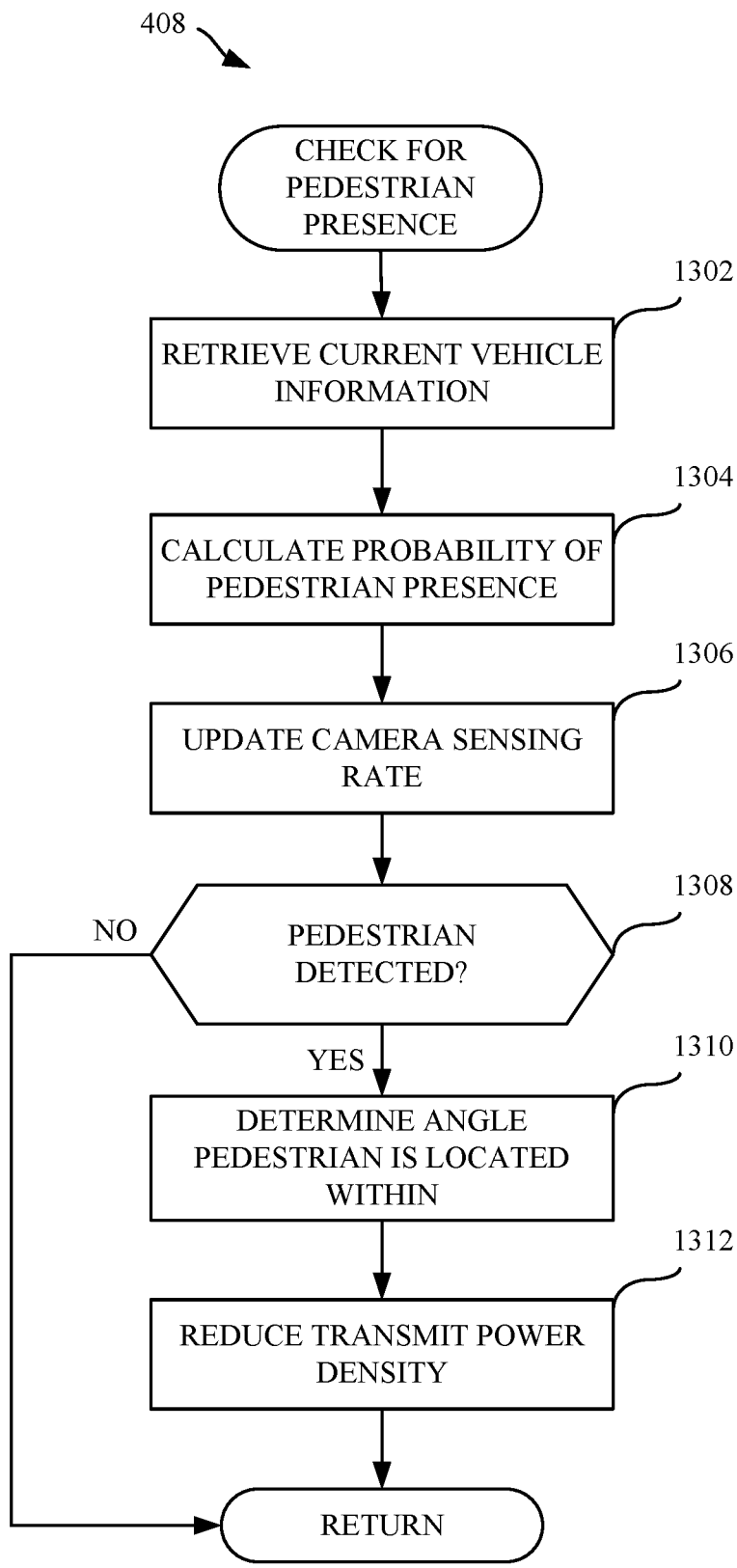
FIG. 13 is a flowchart representative of example machine readable instructions which may be executed to implement the example pedestrian probability calculator of FIG. 3 to detect potential pedestrian presence.

FIG. 13 describes example machine readable instructions which may be executed to implement the example pedestrian probability calculator 330 of FIG. 3 to detect potential pedestrian presence (e.g., example pedestrian 116 of FIG. 1). The example resource manager 316 retrieves the current vehicle information. (Block 1302). In the example disclosed herein, the current vehicle information is stored in the example radar unit database 318. In some examples, vehicle information includes the current global time, the current vehicle position, and the current vehicle speed. In some examples, additional information is retrieved from the radar unit database 318.

The example pedestrian probability calculator 330 then calculates the probability of pedestrian presence in the area the vehicle is located within. (Block 1304). This probability is based on the vehicle information retrieved in block 1302. In the example disclosed herein, the pedestrian probability calculator uses a pre-knowledge process to consider factors that influence the probability of pedestrian presence. For example, the pre-knowledge process associates certain locations (e.g., the example crosswalk 118) with a higher probability of pedestrian presence. The pre-knowledge process also associates certain locations (e.g., the example crosswalk 118) in combination with certain time periods (e.g., business hours) with a higher pedestrian presence.

The example resource manager 316 determines an image sensing rate based on the calculated pedestrian presence probability. The example image accessor 314 updates the image sensing rate in accordance with the calculated pedestrian presence probability. (Block 1306). In some examples, a higher pedestrian presence probability is calculated and the example image accessor 314 increases the image sensing rate in the example image sensor 306. In some examples, a lower pedestrian presence probability is calculated and the example image accessor 314 decreases the image sensing rate in the example image sensor 306. Still in some examples, no change in pedestrian presence probability is calculated and the example image accessor 314 does not change the image sensing rate in the example image sensor 306.

The example image analyzer 315 determines if a pedestrian has been detected. (Block 1308). In the example disclosed herein, the example image accessor 314 accesses images captured by the example image sensor 306 and the example image analyzer 315 applies a perception process to determine whether a pedestrian has been detected. If the example image analyzer 315 determines that a pedestrian has not been detected (e.g., block 1308 returns a result of NO), the radar unit 300 returns to program 400 of FIG. 4.

If the example image analyzer 315 determines that a pedestrian has been detected (e.g., block 1308 returns a result of YES), the example image accessor 314 determines the radar propagation angle in which the pedestrian is located. (Block 1310). In the example disclosed herein, the example image accessor 314 uses the perception process on an image from the example image sensor 306 to compare the coarse direction of the detected pedestrian with the fine propagation angle of radar beam patterns to determine the radar propagation angle the pedestrian is located within. However, in some examples, the example image accessor 314 can use any other image processing technique to determine the radar propagation angle the pedestrian is located within.

The example image accessor 314 reduces the radar transmittance exposure power density only in the angle in which the pedestrian is located. (Block 1312). In some examples, the example image accessor 314 adjusts the automotive radar transmittance power (e.g., power reduction) and/or adjusts the automotive radar transmittance beam-width (e.g., beam widening). However, any other method of adjusting the radar transmittance exposure power density to create a safe level of radiation for pedestrians may additionally or alternatively be used.

While the example disclosed herein uses both GPS-based pre-information and image analysis to detect pedestrian presence, in some examples, additional methods and/or combinations of detecting pedestrians may be used. For example, some vehicles may only use GPS-based pre-information to control the radar transmittance exposure power density. Some examples may only use image sensors and image processing techniques to adjust the radar transmittance exposure power density. In some examples, additional automotive sensors can also be used alone or in combination (e.g., sonar sensors, lidar sensors, etc.).

Figure 14:
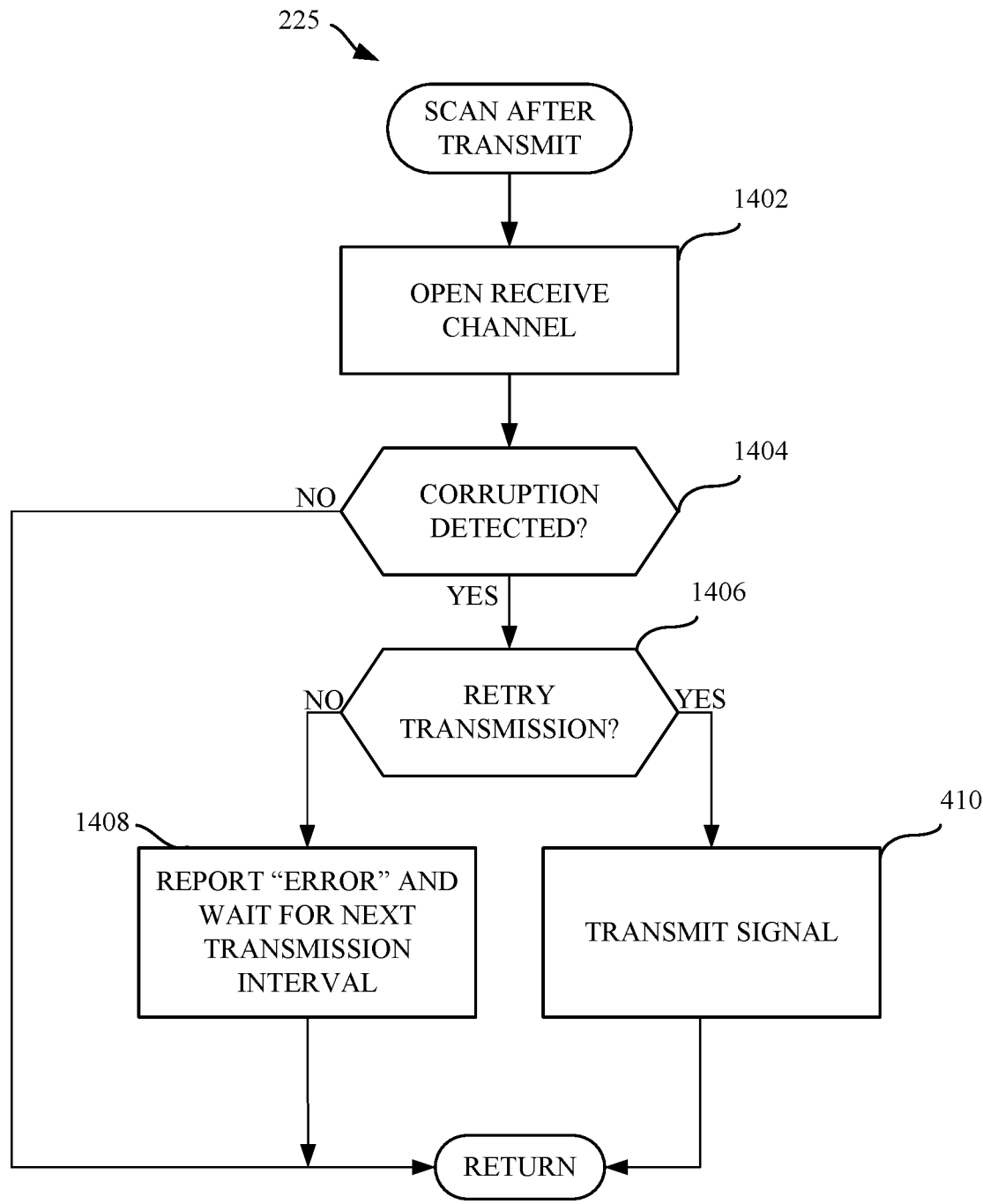
FIG. 14 is a flowchart representative of example machine readable instructions which may be executed to implement the example receiver of FIG. 3 to detect corruption of transmitted signals.

Returning to program 400 of FIG. 4, the example transmitter 308 transmits a signal. (Block 410). The example duplexer 310 switches to the example transmitter 308. The example radar unit 300 uses the example antenna 302 to transmit a signal. The example receiver 312 scans after transmitting a signal. (Block 412). FIG. 14 describes example machine readable instructions which may be executed to implement the example receiver of FIG. 3 to detect corruption of transmitted signals. The example duplexer 310 switches back to the example receiver 312 after a predetermined amount of time in order to receive signals. (Block 1402). The example radar unit 300 uses the example antenna 302 to receive a signal.

The example interference detector 324 determines whether signal corruption is present. (Block 1404). In the example disclosed herein, the example interference detector 324 uses an algorithm that compares the expected reflection time to the actual reflection time of the received signal and determines whether signal corruption occurred based on this time comparison. However, in some examples any other method of detecting signal corruption can be used. If the example interference detector 324 determines that no signal corruption occurred (e.g., block 1404 returns a result of NO), the example radar unit 300 returns to program 400 of FIG. 4.

If the example interference detector 324 determines that signal corruption did occur (e.g., block 1404 returns a result of YES), the example resource manager 316 determines whether to retry signal transmission. (Block 1406). In some examples, the example resource manager 316 considers factors such as a raise in the noise floor of a receiver (e.g., the example receiver 312) and/or saturated receiver power levels. If the example resource manager 316 determines not to retry transmission (e.g., block 1406 returns a result of NO), the example resource manager 316 reports an error message and waits until the next time interval to transmit. (Block 1408). In some examples, the example resource manager 316 updates the example frequency blacklist database 320 with the frequency the corrupted signal used. If the example resource manager 316 decides to retry signal transmission (e.g., block 1406 returns a result of YES), control returns to block 410, where the example process of blocks 410 to 412 is repeated until corruption is not detected (e.g., block 1404 returns a result of NO).

Returning to program 400 of FIG. 4, the example resource manager 316 determines whether to continue transmitting a signal. (Block 414). If the example resource manager 316 decides to continue transmitting (e.g., block 414 returns a result of YES), the example radar unit 300 returns to block 406. If the example resource manager 316 decides to not continue transmitting (e.g., block 414 returns a result of NO), the program 400 ends. In some examples, the example radar unit 300 will continue transmitting (e.g., block 414 always returns a result of YES) while the vehicle is powered on. However, in some examples, the example radar unit 300 can transmit during segments of time that the vehicle is powered on in periodic intervals.

Figure 15:
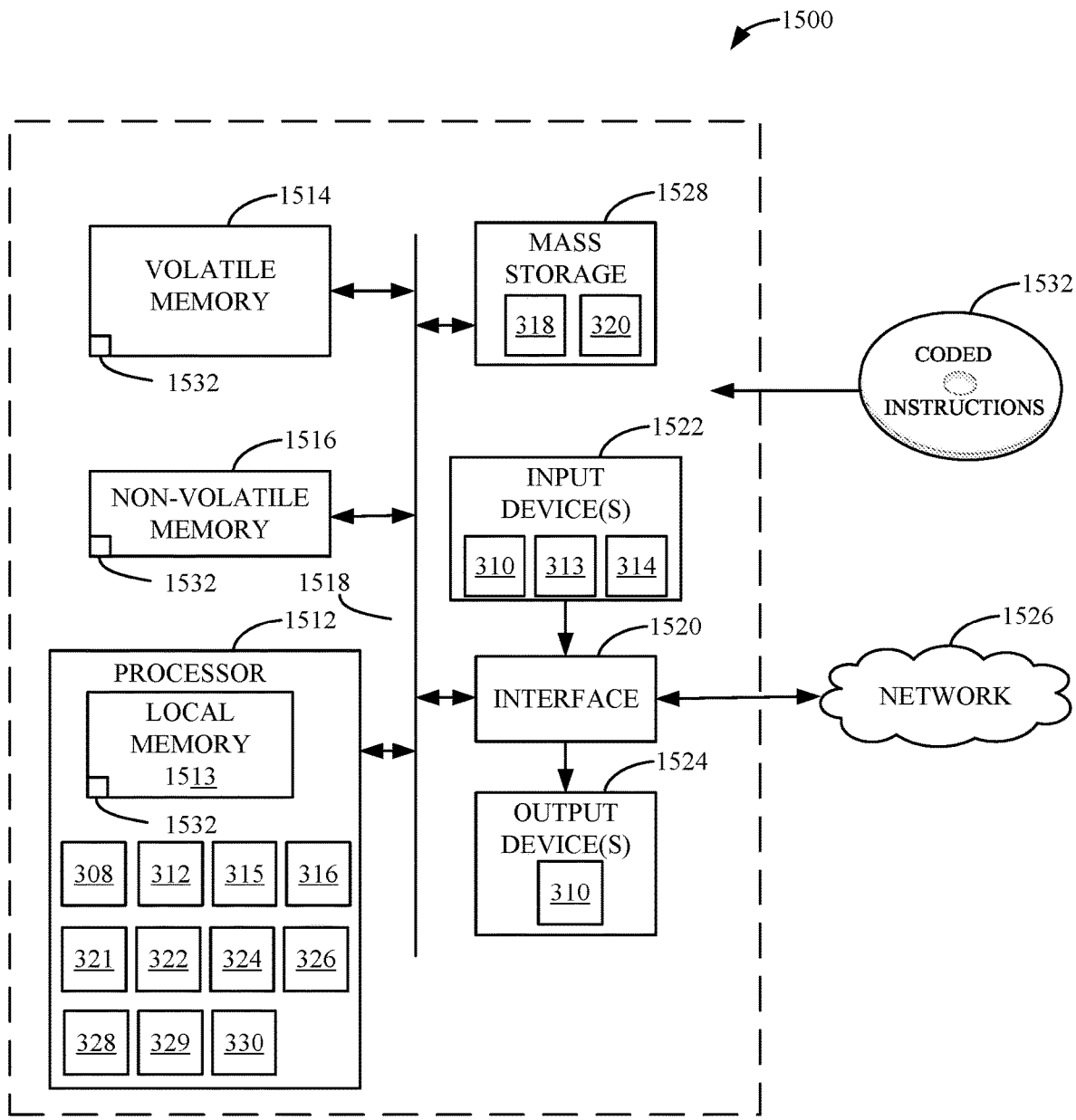
FIG. 15 is a block diagram of an example processing platform structured to execute the instructions of FIGS. 4-5, 7, and 11-14 to implement the example radar unit of FIG. 3.

FIG. 15 is a block diagram of an example processor platform 1500 structured to execute the instructions of FIGS. 4-5, 7, and 11-14 to implement the example radar unit 300 of FIG. 3. The processor platform 1500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example transmitter 308, the example receiver 312, the example image analyzer 315, the example resource manager 316, the example resource multiplexer 321, the example beacon detector 322, the example interference detector 324, the example resource assigner 326, the example resource hopper 328, the example frequency/time counter 329, and the example pedestrian probability calculator 330.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random-Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 4-5, 7, and 11-14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that facilitate communication between sub-processes of an automotive radar coordination system to manage a plurality of radar units both within one vehicle and between vehicles to mitigate radar interference. In some examples, dynamic communicative processes disclosed herein allow for communication and coordination between radar units both within the same vehicle and between vehicles so that resource coordination (e.g., time and frequency) may be performed prior to traditional radar transmission. The disclosed methods, apparatus and articles of manufacture improve the efficiency of using a computing device by decreasing and/or avoiding radar units operating at known interference points (e.g., time and/or frequency resource interferences). The disclosed methods, apparatus and articles of manufacture are accordingly directed to one or more improvement(s) in the functioning of a computer.

Example methods, apparatus, systems, and articles of manufacture to manage automotive radar coordination are disclosed herein. Further examples and combinations thereof include the following:

Example 1 includes an apparatus to coordinate radar resources, the apparatus comprising a resource manager to retrieve radar unit requirements, the radar unit requirements including at least one of a unit ID, current time information, vehicle position information, and radar resource requirements, a resource multiplexer to perform at least one of time multiplexing and frequency multiplexing according to the radar resource requirements, and a resource hopper to at least perform one of frequency hopping and time hopping in response to detecting an amount of interference from other vehicles that exceeds an interference threshold.

Example 2 includes the apparatus of example 1, further including a pedestrian probability calculator to calculate a probability of pedestrian presence based on at least one of current time information and current vehicle position information.

Example 3 includes the apparatus of example 1, further including a global positioning system (GPS) accessor to access GPS information, wherein the GPS information includes at least time information and current vehicle position information.

Example 4 includes the apparatus of example 1, wherein the resource multiplexer is to create a radar resource map.

Example 5 includes the apparatus of example 1, further including a resource group assigner to assign at least one radar unit to a radar resource map.

Example 6 includes the apparatus of example 1, further including an interference detector to detect an interference and determine whether the interference exceeds the interference threshold.

Example 7 includes the apparatus of example 1, wherein the resource hopper is further to report an error message, detect a hidden node problem, and determine whether an interference is received prior to an interference time threshold.

Example 8 includes the apparatus of example 1, further including an image accessor to update an image sensing rate based on the probability of pedestrian presence.

Example 9 includes the apparatus of example 1, further including an image analyzer to detect pedestrian presence in an image.

Example 10 includes the apparatus of example 8, wherein in response to pedestrian presence, the image accessor is further to determine a radar beam angle in which the pedestrian is located, and reduce radar transmission power density within the radar beam angle.

Example 11 includes the apparatus of example 10, wherein the image accessor reduces the radar transmission power density by at least one of power reduction or beam widening.

Example 12 includes the apparatus of example 1, wherein in response to corruption after signal transmission, the resource manager determines whether to retry transmission.

Example 13 includes at least one non-transitory computer readable medium comprising instructions that, when executed, cause at least one processor to at least retrieve radar unit requirements, the radar unit requirements including at least one of a unit ID, current time information, vehicle position information, and radar resource requirements, perform at least one of time multiplexing and frequency multiplexing according to the radar resource requirements, and perform at least one of frequency hopping and time hopping in response to detecting an amount of interference from other vehicles that exceeds an interference threshold.

Example 14 includes the at least one non-transitory computer readable medium of example 13, wherein the instructions, when executed, cause at least one processor to calculate a probability of pedestrian presence based on at least one of current time information and current vehicle position information example 15 includes the at least one non-transitory computer readable medium of example 13, wherein the instructions, when executed, cause the at least one processor to access GPS information, wherein the GPS information includes at least time information and current vehicle position information.

Example 16 includes the at least one non-transitory computer readable medium of example 13, wherein the instructions, when executed, cause the at least one processor to create a radar resource map.

Example 17 includes the at least one non-transitory computer readable medium of example 13, wherein the instructions, when executed, cause the at least one processor to assign at least one radar unit to a radar resource map.

Example 18 includes the at least one non-transitory computer readable medium of example 13, wherein the instructions, when executed, cause the at least one processor to detect an interference and determine whether the interference exceeds the interference threshold.

Example 19 includes the at least one non-transitory computer readable medium of example 13, wherein the instructions, when executed, cause the at least one processor to report an error message, detect a hidden node problem, and determine whether an interference is received prior to an interference time threshold.

Example 20 includes the at least one non-transitory computer readable medium of example 13, wherein the instructions, when executed, cause the at least one processor to update an image sensing rate based on the probability of pedestrian presence.

Example 21 includes the at least one non-transitory computer readable medium of example 13, wherein the instructions, when executed, cause the at least one processor to detect pedestrian presence in an image.

Example 22 includes the at least one non-transitory computer readable medium of example 20, wherein the instructions, when executed, cause the at least one processor to determine a radar beam angle in which the pedestrian is located and reduce radar transmission power density within the radar beam angle.

Example 23 includes the at least one non-transitory computer readable medium of example 22, wherein the instructions, when executed, cause the at least one processor to reduce the radar transmission power density by at least one of power reduction or beam widening.

Example 24 includes the at least one non-transitory computer readable medium of example 13, wherein the instructions, when executed, cause the at least one processor to determine whether to retry transmission in response to detected corruption.

Example 25 includes an apparatus for coordinating radar resources, the apparatus comprising means for retrieving radar unit requirements, the radar unit requirements including at least one of a unit ID, current time information, vehicle position information, and radar resource requirements, means for performing at least one of time multiplexing and frequency multiplexing according to the radar resource requirements, and means for hopping along at least one of frequency and time in response to detecting an amount of interference from other vehicles that exceeds an interference threshold.

Example 26 includes the apparatus of example 25, further including means for accessing GPS information, wherein the GPS information includes at least time information and current vehicle position information.

Example 27 includes a method of coordinating radar resources, the method comprising retrieving, by executing an instruction with a processor, the radar unit requirements including at least one of a unit ID, current time information, vehicle position information, and radar resource requirements, performing, by executing an instruction with a processor, at least one of time multiplexing and frequency multiplexing according to the radar resource requirements, and performing, by executing an instruction with a processor, at least one of frequency hopping and time hopping in response to detecting an amount of interference from other vehicles that exceeds an interference threshold.

Example 28 includes the method of example 27, further including calculating a probability of pedestrian presence based on at least one of current time information and current vehicle position information.

Example 29 includes the method of example 27, further including accessing GPS information, wherein the GPS information includes at least time information and current vehicle position information.

Example 30 includes the method of example 27, wherein resource multiplexing is to create a radar resource map.

Example 31 includes the method of example 27, further including assigning at least one radar unit to a radar resource map.

Example 32 includes the method of example 27, further including detecting an interference and determining whether the interference exceeds the interference threshold.

Example 33 includes the method of example 27, further including reporting an error message, detecting a hidden node problem, and determining whether an interference is received prior to an interference time threshold.

Example 34 includes the method of example 27, further including updating an image sensing rate based on the probability of pedestrian presence.

Example 35 includes the method of example 27, further including detecting pedestrian presence in an image.

Example 36 includes the method of example 34, wherein responding to detected pedestrian presence includes determining a radar beam angle in which the pedestrian is located and reducing the radar transmission power density within the angle the pedestrian is located within.

Example 37 includes the method of example 36, wherein reducing the radar transmission power density includes at least power reduction and/or beam widening.

Example 38 includes the method of example 27, wherein responding to corruption after signal transmission includes determining whether to retry transmission. further including a GPS accessor to access GPS information, wherein the GPS information includes at least time information and current vehicle position information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to coordinate radar resources, the apparatus comprising:
   a resource manager to retrieve radar unit requirements, the radar unit requirements including at least one of a unit ID, current time information, vehicle position information, and radar resource requirements;
   a resource multiplexer to perform at least one of time multiplexing and frequency multiplexing according to the radar resource requirements;
   a resource hopper to at least perform one of frequency hopping and time hopping in response to detecting an amount of interference from other vehicles that exceeds an interference threshold; and
   an image accessor to reduce radar transmission power density within a radar beam angle, the reduction based on a probability of a pedestrian presence within the radar beam angle.

2. The apparatus of claim 1, further including a pedestrian probability calculator to calculate the probability of pedestrian presence based on at least one of current time information and current vehicle position information.

3. The apparatus of claim 1, further including a global positioning system (GPS) accessor to access GPS information, wherein the GPS information includes at least time information and current vehicle position information.

4. The apparatus of claim 1, wherein the resource multiplexer is to create a radar resource map.

5. The apparatus of claim 1, further including a resource group assigner to assign at least one radar unit to a radar resource map.

6. The apparatus of claim 1, further including an interference detector to detect an interference and determine whether the interference exceeds the interference threshold.

7. The apparatus of claim 1, wherein the resource hopper is further to report an error message, detect a hidden node problem, and determine whether an interference is received prior to an interference time threshold.

8. The apparatus of claim 1, wherein the image accessor is to update an image sensing rate based on the probability of pedestrian presence.

9. The apparatus of claim 1, wherein the image accessor reduces the radar transmission power density by at least one of power reduction or beam widening.

10. The apparatus of claim 1, further including an image analyzer to detect pedestrian presence in an image.

11. The apparatus of claim 1, wherein in response to corruption after signal transmission, the resource manager determines whether to retry transmission.

12. The apparatus of claim 1, wherein the resource manager is to transmit a radio frequency (RF) signal after: a) the resource hopper performs the at least one of frequency hopping or time hopping, and b) the image accessor reduces the radar transmission power density.

13. At least one non-transitory computer readable medium comprising instructions that, when executed, cause at least one processor to at least:
retrieve radar unit requirements, the radar unit requirements including at least one of a unit ID, current time information, vehicle position information, and radar resource requirements;
perform at least one of time multiplexing and frequency multiplexing according to the radar resource requirements;
perform at least one of frequency hopping and time hopping in response to detecting an amount of interference from other vehicles that exceeds an interference threshold; and
reduce radar transmission power density within a radar beam angle, the reduction based on a probability of a pedestrian presence within the radar beam angle.

14. The at least one non-transitory computer readable medium of claim 13, wherein the instructions, when executed, cause at least one processor to calculate the probability of pedestrian presence based on at least one of current time information and current vehicle position information.

15. The at least one non-transitory computer readable medium of claim 13, wherein the instructions, when executed, cause the at least one processor to access GPS information, wherein the GPS information includes at least time information and current vehicle position information.

16. The at least one non-transitory computer readable medium of claim 13, wherein the instructions, when executed, cause the at least one processor to create a radar resource map.

17. The at least one non-transitory computer readable medium of claim 13, wherein the instructions, when executed, cause the at least one processor to assign at least one radar unit to a radar resource map.

18. The at least one non-transitory computer readable medium of claim 13, wherein the instructions, when executed, cause the at least one processor to detect an interference and determine whether the interference exceeds the interference threshold.

19. The at least one non-transitory computer readable medium of claim 13, wherein the instructions, when executed, cause the at least one processor to report an error message, detect a hidden node problem, and determine whether an interference is received prior to an interference time threshold.

20. The at least one non-transitory computer readable medium of claim 13, wherein the instructions, when executed, cause the at least one processor to update an image sensing rate based on the probability of pedestrian presence.

21. The at least one non-transitory computer readable medium of claim 13, wherein the instructions, when executed, cause the at least on processor to transmit a radio frequency (RF) signal after: a) performing the at least one of frequency hopping or time hopping, and b) reducing the radar transmission power density.

22. An apparatus for coordinating radar resources, the apparatus comprising:
means for retrieving radar unit requirements, the radar unit requirements including at least one of a unit ID, current time information, vehicle position information, and radar resource requirements;
means for performing at least one of time multiplexing and frequency multiplexing according to the radar resource requirements;
means for hopping along at least one of frequency and time in response to detecting an amount of interference from other vehicles that exceeds an interference threshold; and
means for accessing an image to reduce radar transmission power density within a radar beam angle, the reduction based on a probability of a pedestrian presence within the radar beam angle.

23. The apparatus of claim 22, further including means for accessing GPS information, wherein the GPS information includes at least time information and current vehicle position information.

24. A method of coordinating radar resources, the method comprising:
retrieving, by executing an instruction with a processor, radar unit requirements including at least one of a unit ID, current time information, vehicle position information, and radar resource requirements;
performing, by executing an instruction with a processor, at least one of time multiplexing and frequency multiplexing according to the radar resource requirements; and
performing, by executing an instruction with a processor, at least one of frequency hopping and time hopping in response to detecting an amount of interference from other vehicles that exceeds an interference threshold; and
reducing, by executing an instruction with a processor, radar transmission power density within a radar beam angle, the reduction based on a probability of a pedestrian presence within the radar beam angle.

25. The method of claim 24, further including calculating the probability of pedestrian presence based on at least one of current time information and current vehicle position information.

* * * * *